United States Patent
Clifton, III et al.

(10) Patent No.: US 12,417,716 B2
(45) Date of Patent: Sep. 16, 2025

(54) SYSTEMS AND METHODS FOR SURGICAL TRAINING MODEL

(71) Applicant: Mayo Foundation for Medical Education and Research, Rochester, MN (US)

(72) Inventors: William E. Clifton, III, Jacksonville, FL (US); Aaron C. Damon, Jacksonville, FL (US); Eric W. Nottmeier, Atlantic Beach, FL (US); Mark A. Pichelmann, Ponte Bedgra Beach, FL (US); Alfredo Quinones-Hinojosa, Ponte Vedra Beach, FL (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 725 days.

(21) Appl. No.: 17/787,405

(22) PCT Filed: Dec. 18, 2020

(86) PCT No.: PCT/US2020/065977
§ 371 (c)(1),
(2) Date: Jun. 20, 2022

(87) PCT Pub. No.: WO2021/127410
PCT Pub. Date: Jun. 24, 2021

(65) Prior Publication Data
US 2023/0136935 A1    May 4, 2023

Related U.S. Application Data

(60) Provisional application No. 62/951,861, filed on Dec. 20, 2019.

(51) Int. Cl.
*G09B 23/30* (2006.01)
*B01J 23/02* (2006.01)
(Continued)

(52) U.S. Cl.
CPC .............. *G09B 23/30* (2013.01); *B01J 23/02* (2013.01); *B01J 27/232* (2013.01); *B33Y 10/00* (2014.12)

(58) Field of Classification Search
CPC .......... G09B 23/28; G09B 23/30; B29C 45/14
See application file for complete search history.

(56) References Cited

U.S. PATENT DOCUMENTS

| 5,306,749 A | 4/1994 | Columbus et al. |
| 6,268,413 B1 | 7/2001 | Columbus et al. |

(Continued)

FOREIGN PATENT DOCUMENTS

| BR | 1004465 A2 | 5/2012 |
| WO | 87/06946 A1 | 11/1987 |

(Continued)

OTHER PUBLICATIONS

Potter, B. K., Lehman, R. A. J. & Kuklo, T. R. Anatomy and biomechanics of thoracic pedicle screw instrumentation, Current Opinion Orthopaedics, vol. 15, No. 3, pp. 133-144 (2004).

(Continued)

*Primary Examiner* — Kurt Fernstrom
(74) *Attorney, Agent, or Firm* — Quarles & Brady LLP

(57) ABSTRACT

Disclosed are a method for creating a surgical training model, a surgical training model apparatus, a bone model, an article that emulates tissue of an animal musculoskeletal system, an article that emulates animal fat tissue, and an article that emulates animal skin tissue. One version of the method comprises placing a spinal vertebrae model in a cavity model that emulates an animal body cavity; forming (Continued)

a first layer on top of the vertebrae model, wherein the first layer emulates an animal muscle tissue; placing a second layer over the first layer, wherein the second layer emulates an animal fat tissue; and placing a third layer over the second layer, wherein the third layer emulates an animal skin tissue. The spinal vertebrae model can be 3D printed from a thermoplastic polymer and infiltrated with a foam into an interior space of the 3D printed spinal vertebrae model.

20 Claims, 15 Drawing Sheets

(51) Int. Cl.
  *B01J 27/232* (2006.01)
  *B33Y 10/00* (2015.01)

(56) References Cited

U.S. PATENT DOCUMENTS

| | | | |
|---|---|---|---|
| 7,427,199 | B2 | 9/2008 | Sakezles et al. |
| 8,568,148 | B2 | 10/2013 | Miller et al. |
| 8,801,738 | B2 | 8/2014 | Yoon et al. |
| 8,814,573 | B2 | 8/2014 | Nguyen et al. |
| 9,514,658 | B1 * | 12/2016 | Hart ............... B29C 70/021 |
| 9,805,624 | B2 | 10/2017 | Reihsen et al. |
| 10,290,234 | B2 * | 5/2019 | Blair-Pattison ......... A61L 27/40 |
| 10,738,175 | B2 | 8/2020 | Davidson et al. |
| 10,806,532 | B2 | 10/2020 | Grubbs et al. |
| 11,373,554 | B2 | 6/2022 | Myers et al. |
| 11,814,511 | B2 * | 11/2023 | Ohta ..................... G09B 23/30 |
| 2006/0241150 | A1 | 10/2006 | Weiner et al. |
| 2008/0248086 | A1 | 10/2008 | Asgari |
| 2020/0208102 | A1 * | 7/2020 | Ohta ..................... C12N 5/0062 |
| 2023/0289959 | A1 * | 9/2023 | Niimi .................... G09B 23/30 |

FOREIGN PATENT DOCUMENTS

| | | |
|---|---|---|
| WO | 2012/161646 A2 | 11/2012 |
| WO | 2016/056025 A1 | 4/2016 |
| WO | 2018/222779 A1 | 12/2018 |
| WO | 2019/034791 A1 | 2/2019 |
| WO | 2019/177993 A1 | 9/2019 |

OTHER PUBLICATIONS

Puvanesarajah, V., Liauw, J. A., Lo, S.-F., Lina, I. A. & Witham, T. F., Techniques and accuracy of thoracolumbar pedicle screw placement, World Journal of Orthopedics, vol. 5, No. 2, pp. 112-123 (2014).
Rho, J-Y et al., Mechanical properties and the hierarchical structure of bone, Medical Engineering & Physics, vol. 20, 1998, pp. 92-102.
Riggs, B. L. et al. Population-Based Study of Age and Sex Differences in Bone Volumetric Density, Size, Geometry, and Structure at Different Skeletal Sites, Journal of Bone and Mineral Research, 2004, vol. 19, No. 12, pp. 1945-1954, doi:10.1359/jbmr.040916.
Selden, N. R., Barbaro, N., Origitano, T. C. & Burchiel, K. J., Fundamental skills for entering neurosurgery residents: Report of a pacific region "boot camp" pilot course, 2009, Neurosurgery, vol. 68, No. 3, 2011 pp. 759-764; discussion 764, doi:10.1227/NEU.0b013e3182077969.
Selden, N. R. et al., A national fundamentals curriculum for neurosurgery PGY1 residents: The 2010 society of neurological surgeons boot camp courses, Neurosurgery, vol. 70, No. 4, pp. 971-981; discussion 981 (2012).
Sharp, D. J., Tanner, K. E. & Bonfield, W., Measurement of the density of trabecular bone. Journal of Biomechanics, vol. 23, No. 8, pp. 853-857 (1990).
Stienen, M. N. et al., Neurosurgical resident education in Europe☐results of a multinational survey, Acta Neurochirurgica, (Wien) vol. 158, pp. 3-15 (2016).
Stienen, M. N. et al., Residency program trainee-satisfaction correlate with results of the European board examination in neurosurgery, Acta. Neurochirurgica, (Wien) vol. 158, pp. 1823-1830 (2016).
Thirukumaran, C. P. et al., National trends in the surgical management of adult lumbar isthmic spondylolisthesis: 1998 to 2011, Spine (Phila Pa 1976), vol. 41, No. 6, pp. 490-501 (2016).
Thomas, B., Basic surgical skills courses: An educational success story, Ann. R. Coll. Surg. Engl., vol. 81, pp. 195-196 (1999).
Thomas, W. E. G., Teaching and assessing surgical competence, Ann. R. Coll. Surg. Engl., vol. 88, pp. 429-432, (2006).
Tortolani, P. J. et al., Cadaver training module for teaching thoracic pedicle screw placement to residents, Orthopedics, 2013, vol. 36, pp. 1128-1133, doi:10.3928/01477447-20130821-13.
Tretinnikov, O. et al., Effect of inorganic salts on the crytallinity of polyvinyl alcohol, Journal of Applied Spectoscopy, 2012, vol. 78, No. 6., pp. 904-908.
Varghese, V., Krishnan, V. & Saravana Kumar, G., Testing pullout strength of pedicle screw using synthetic bone models: Is a bilayer foam model a better representation of vertebra? Asian Spine Journal, 2018, vol. 12, No. 3, pp. 398-406, doi:10.4184/asj.2018.12.3.398.
Wang, X. & Ni, Q., Determination of cortical bone porosity and pore size distribution using a low field pulsed NMR approach, Journal of Orthopaedic Research, vol. 21, pp. 312-319 (2003).
White, John, Straight talk about high-fructose corn syrup: what it is and what it ain't 1-4, American Journal Clinical Nutrition, vol. 88 (suppl): pp. 1716S-1721S (2008).
Whitmarsh, T. et al., A cross-sectional study on the age-related cortical and trabecular bone changes at the femoral head in elderly female hip fracture patients, Scientific reports, 9: 305 (2019).
Wu, D., Isaksson, P., Ferguson, S. J. & Persson, C., Young's modulus of trabecular bone at the tissue level: A review, Acta Biomateriala, vol. 78, pp. 1-12 (2018).
Zioupos, P., Cook, R. B. & Hutchinson, J. R., Some basic relationships between density values in cancellous and cortical bone, Journal of Biomechanics, vol. 41, No. 9, pp. 1961-1968 (2008).
Matweb Material Property Data, Cortical Bone, https://www.matweb.com/search/DataSheet.aspx?MatGUID=1e9fb6eae0cc4a52a3e9a67f14621a9a, printed Dec. 11, 2020, 1 page.
Bonesim Laboratories, Cortical Series, https://www.bonesim.com/yahoo_site_admin/assets/images/table, printed Dec. 11, 2020, 1 page.
Ahmed Ali, U. & Vogel, J. D. Safety of surgical resident training. Adv Surg 47, pp. 45-57 (2013).
Antiel, R. M. et al. Effects of duty hour restrictions on core competencies, education, quality of life, and burnout among general surgery interns. JAMA. Surg. 148, pp. 448-455 (2013).
Aronold, M. et al., Microindentation—a tool for measuring cortical bone stiffness?, Bone Joint Research, 2017, vol. 6, No. 9, pp. 542-549.
Atesok, K., Mabrey, J. D., Jazrawi, L. M. & Egol, K., A. Surgical simulation in orthopaedic skills training, J Am Acad Orthop Surg 20, pp. 410-422 (2012).
Babineau, T. J. et al. The cost of operative training for surgical residents. Arch Surg 139, pp. 366-369; discussion 369-370 (2004).
Badash, I., Burtt, K., Solorzano, C. A. & Carey, J. N. Innovations in surgery simulation: A review of past, current and future techniques. Ann. Transl. Med. 4, 453 (2016).
Ball, David W., The Chemical Composition of Maple Syrup, Chemistry for Everyone, pp. 1-4.
Barak, M. M. & Black, M. A. A novel use of 3d printing model demonstrates the effects of deteriorated trabecular bone structure on bone stiffness and strength. Journal of the Mechanical Behavior of Biomedical Materials, vol. 78, pp. 455-464 (2018).
Bohl, M.A. et al., The Barrow Biomimetic Spine: Comparative Testing of a 3D-Printed L4-L5 Schwab Grade 2 Osteotomy Model to a Cadaveric Model, Cureus, 2018, 10(4): e2491.
Bohl, M. A. et al. The barrow biomimetic spine: Fluoroscopic analysis of a synthetic spine model made of variable 3d-printed materials and print parameters. Spine (Phila Pa 1976) 43, pp. E1368-e1375 (2018).

(56) References Cited

OTHER PUBLICATIONS

Bohl, M. A. et al. The barrow biomimetic spine: Effect of a 3-dimensional-printed spinal osteotomy model on performance of spinal osteotomies by medical students and interns. J Spine Surg 5, pp. 58-65 (2019).
Calvert, K. L., Trumble, K. P., Webster, T. J. & Kirkpatrick, L. A., Characterization of commercial rigid polyurethane foams used as bone analogs for implant testing, J Mater Sci Mater Med 21, pp. 1453-1461 (2010).
Chapman, J. R. et al. Factors affecting the pullout strength of cancellous bone screws, Journal of Biomechanical Engineering, vol. 118, No. 3, pp. 391-398 (1996).
Chong, A C.M. et al, Fracture Toughness and Fatigue Crack Propagation Rate of ShortFiber Reinforced Epoxy Composites for Analogue Cortica lBone, Journal of Biomechanical Engineering, 2007, vol. 127, pp. 487-493.
Clifton, W. et al. A feasibility study for the production of three-dimensional-printed spine models using simultaneously extruded thermoplastic polymers. Cureus 11, e4440 (2019).
Clifton, W., Nottmeier, E., Damon, A., Dove, C. & Pichelmann, M., The future of biomechanical spine research: Conception and design of a dynamic 3d printed cervical myelography phantom. Cureus 11, e4591 (2019).
Clifton, W. et al. Development of a novel 3d printed phantom for teaching neurosurgical trainees the freehand technique of c2 laminar screw placement. World. Neurosurg. 129, pp. e812-e820 (2019).
Clifton, W. E., Damon, A. C. & Freeman, W. D. Development of a lumbar drain simulator for instructional technique and skill assessment. Neurocrit. Care., doi:10.1007/s12028-019-00790-9 (2019).
Clifton, W., Damon, A., Nottmeier, E. & Pichelmann, M., The importance of teaching clinical anatomy in surgical skills education: Spare the patient, use a sim! Clinical Anatomy, vol. 33, No. 1, pp. 124-127 (2019).
Cristofolini, L. & Viceconti, M. Mechanical validation of whole bone composite tibia models. Journal of Biomechanics, vol. 33, No. 3, pp. 279-288 (2000).
Cristofololini, L., Viceconti, M., Cappello, A. & Toni, A. Mechanical validation of whole bone composite femur models, Journal of Biomechanics, vol. 29, No. 4, pp. 525-535 (1996).
Fernandez, G. L. et al., Boot camp: Educational outcomes after 4 successive years of preparatory simulation-based training at onset of internship. Journal of Surgical Education, vol. 69, No. 2, pp. 242-248 (2012).
Ferrada, P., Anand, R. J., Amendola, M. & Kaplan, B. Cadaver laboratory as a useful tool for resident training, the American Surgeon, vol. 80, No. 4, pp. 408-409 (2014).
Filippou, V. & Tsoumpas, C., Recent advances on the development of phantoms using 3d printing for imaging with CT, MRI, PET, SPECT, and ultrasound, Medical Physics, vol. 45, No. 9, pp. e740-e760 (2018).
Gama, N. V., Ferreira, A. & Barros-Timmons, A., Polyurethane foams: Past, present, and future, Materials (Basel, Switzerland) vol. 11, No. 1841, pp. 1-35. (2018).
Geng, S. et al, Plasticizing and crosslinking effects of borate additives on the structure and properties of poly(vinyl acetate), RSC Advances, vol. 7, 2017, pp. 7483-7491.
George, E., Liacouras, P., Rybicki, F. J. & Mitsouras, D., Measuring and establishing the accuracy and reproducibility of 3d printed medical models, RadioGraphics, vol. 37, No. 5, pp. 1424-1450 (2017).
Gong, H., Wang, L., Fan, Y., Zhang, M. & Qin, L., Apparent- and tissue-level yield behaviors of I4 vertebral trabecular bone and their associations with microarchitectures, Ann Biomed Eng 44, pp. 1204-1223 (2016).
Grow B, S. J. The body trade, (2017).

Gunderman, R. B. & Wilson, P. K., Viewpoint: Exploring the human interior: The roles of cadaver dissection and radiologic imaging in teaching anatomy, Academic Medecine, vol. 80, No. 8, pp. 745-749, (2005).
Hao, J. et al, Material characterization and selection for 3D-printed spine models, 3D Printing in Medecine, 2018, vol. 4:8, pp. 1-17.
Heiner, A. D. & Brown, T. D., Structural properties of a new design of composite replicate femurs and tibias, Journal of Biomechanics, vol. 34, No. 6, pp. 773-781 (2001).
Henriks-Eckerman, M. L., Valimaa, J., Rosenberg, C., Peltonen, K. & Engstrom, K., Exposure to airborne isocyanates and other thermal degradation products at polyurethane-processing workplaces, Journal of Environmental Monitoring, vol. 4, No. 5, pp. 717-721 (2002).
Hetaimish, B. M., Sawbones laboratory in orthopedic surgical training, Saudi Medical Journal, vol. 37, No. 4, pp. 348-353 (2016).
Hoffmeister, B. K., Huber, M. T., Viano, A. M. & Huang, J., Characterization of a polymer, open-cell rigid foam that simulates the ultrasonic properties of cancellous bone, Journal of the Acoustical Society of America, vol. 143, pp. 911-920 (2018).
Kabins, M. B. & Weinstein, J. N., The history of vertebral screw and pedicle screw fixation, the history of vertebral screw and pedicle screw fixation owa, Orthopaedic Journal, vol. 11, pp. 127-136 (1991).
Kim, Y. J., Lenke, L. G., Bridwell, K. H., Cho, Y. S. & Riew, K. D., Free hand pedicle screw placement in the thoracic spine: Is it safe?, Spine vol. 29, No. 3, pp. 333-342 (2004).
Kobayashi, K., Ando, K., Nishida, Y., Ishiguro, N. & Imagama, S. Epidemiological trends in spine surgery over 10 years in a multicenter database. Eur. Spine. J. 27, pp. 1698-1703 (2018).
Koniorczyk, P., Trzyna, M., Zmy, Int. J. Thermophys, vol. 38, No. 71 (2017).
Kovacs, G., Levitan, R. & Sandeski, R., Clinical cadavers as a simulation resource for procedural learning, AEM Education and Training, vol. 2, No. 3, pp. 239-247 (2018).
Lehman, R. A., Jr., Kang, D. G., Lenke, L. G., Gaume, R. E. & Paik, H., The ventral lamina and superior facet rule: A morphometric analysis for an ideal thoracic pedicle screw starting point, The Spine Journal, vol. 14, No. 1, pp. 137-144 (2014).
Li, Y., Li, Z., Ammanuel, S., Gillan, D. & Shah, V., Efficacy of using a 3d printed lumbosacral spine phantom in improving trainee proficiency and confidence in CT-guided spine procedures, 3D Printing in Medicine, vol. 4, No. 7, (2018).
Malangoni, M. A., Biester, T. W., Jones, A. T., Klingensmith, M. E. & Lewis, F. R., Jr. Operative experience of surgery residents: Trends and challenges. J Surg Educ 70, pp. 783-788 (2013).
Memon, I., Cadaver dissection is obsolete in medical training! A misinterpreted notion, Medical Principles and Practice, vol. 27, No. 3, pp. 201-210 (2018).
Mowery, Y. M., A primer on medical education in the United States through the lens of a current resident physician, Annals of Translational Medicine, vol. 3, 18: 270 (2015).
Odgaard, A., Three-dimensional methods for quantification of cancellous bone architecture, Bone, vol. 20, No. 4, pp. 315-328 (1997).
Ott, S. M., Cortical or trabecular bone: What's the difference? American Journal of Nephrology, vol. 47, No. 6, pp. 373-375 (2018).
Pasoto, S. G. et al., Cortical bone density and thickness alterations by high-resolution peripheral quantitative computed tomography: Association with vertebral fractures in primary sjögren's syndrome, Rheumatology, vol. 55, pp. 2200-2211 (2016).
Peppas, Turbidimetric studies of aqueous poly(vinyl alcohol) solutions, Die Makromolekulare Chemie, vol. 176, No. 11, Nov. 1975, pp. 3433-3440, https://onlinelibrary.wiley.com/doi/epdf/10.1002/macp.1975.021761125.
Pereira, B. J. et al., Spinal surgery for degenerative lumbar spine disease: Predictors of outcome, Clinical Neurology Neurosurgery, vol. 140, pp. 1-5 (2016).

* cited by examiner

SYSTEMS AND METHODS FOR SURGICAL TRAINING MODEL

CROSS-REFERENCES TO RELATED APPLICATIONS

This application claims priority to U.S. Patent Application No. 62/951,861 filed Dec. 20, 2019, which is hereby incorporated by reference herein in its entirety for all purposes.

STATEMENT REGARDING FEDERALLY SPONSORED RESEARCH

Not Applicable.

BACKGROUND OF THE INVENTION

1. Field of the Invention

This invention relates to a surgical training model and methods for creating the surgical training model and for performing simulating procedures using the surgical training model. In particular, the invention is related to a spinal model for surgical training procedures.

2. Description of the Related Art

Spinal disorders are one of the most common diagnoses in medicine. Spinal surgeries resulting from spinal disorders include spinal fixation in the form of pedicle screw placement for lower cervical, thoracic, and lumbar instrumentation. Medical students and residents are required to master these procedures as part of both neurosurgical and orthopedic training programs. Safe pedicle screw placement revolves around a comprehensive knowledge of pedicle anatomy in relation to the surrounding neurovascular structures. Case volume and quality among training programs are highly variable both in the United States and the world, which can significantly affect exposure and competency regarding these techniques.

A common adjunct to surgical educational curricula include cadaveric models. The use of cadaveric tissue is fraught with variability in specimen quality, accessibility, and cost. There is limited regulation on cadaver cost. For example, average facility requirements are greater than one million dollars. In addition, regulations for human tissue specimens are strict, only deeming about 20% of acquired cadaveric tissue suitable for surgical simulation. Many institutions are not able to facilitate human tissue specimens due to complex housing and personnel requirements for human tissue storage.

What is needed therefore is an improved surgical training module and methods for creating a surgical training module.

SUMMARY OF THE INVENTION

The present invention provides systems and methods for a surgical training model that can be used as a surgical training module for teaching medical students and residents. The surgical training model emulates an animal body and provides an anatomically correct model that can be used as a valid simulator compared to animal tissue for surgical anatomy and instrumentation.

It is one advantage of the invention to provide a method for creating a surgical training model. The method can include the steps of: (a) providing a bony structure selected from a bone model or bone cadaveric tissue; (b) placing the bony structure in a cavity model that emulates an animal body cavity; and (c) forming a first layer in the cavity model, on top of the bony structure, wherein the first layer emulates one or more tissues of an animal musculoskeletal system (e.g., animal muscle tissue).

Another advantage of the invention is to provide a surgical training model apparatus comprising: a cavity model that emulates an animal body cavity; a bone model placed in the cavity model, wherein the bone model is 3D printed from a thermoplastic polymer; and a first layer on top of the bone model, wherein the first layer emulates one or more tissues of an animal musculoskeletal system (e.g., animal muscle tissue).

Another advantage of the invention is to provide a bone model comprising an outer structure 3D printed from a thermoplastic polymer, the outer structure defining an interior space; and a foam filling in the interior space.

Another advantage of the invention is to provide an article that emulates one or more tissues of an animal musculoskeletal system (e.g., animal muscle tissue). The article comprises a reaction product of polyvinyl acetate, a source of sugar, a crystallization agent, and a basic catalyst.

Another advantage of the invention is to provide an article that emulates an animal fat tissue. The article comprises a reaction product of polyvinyl acetate, a crystallization agent, and a basic catalyst.

Another advantage of the invention is to provide an article that emulates an animal skin tissue. The article comprises a fiber cloth impregnated with a reaction product of polyvinyl acetate and a basic catalyst.

These and other features, aspects, and advantages of the present invention will become better understood upon consideration of the following detailed description, drawings and appended claims.

BRIEF DESCRIPTION OF THE DRAWINGS

Like reference numerals will be used to refer to like parts from Figure to Figure in the following description of the drawings.

DETAILED DESCRIPTION OF THE INVENTION

Figure 1:
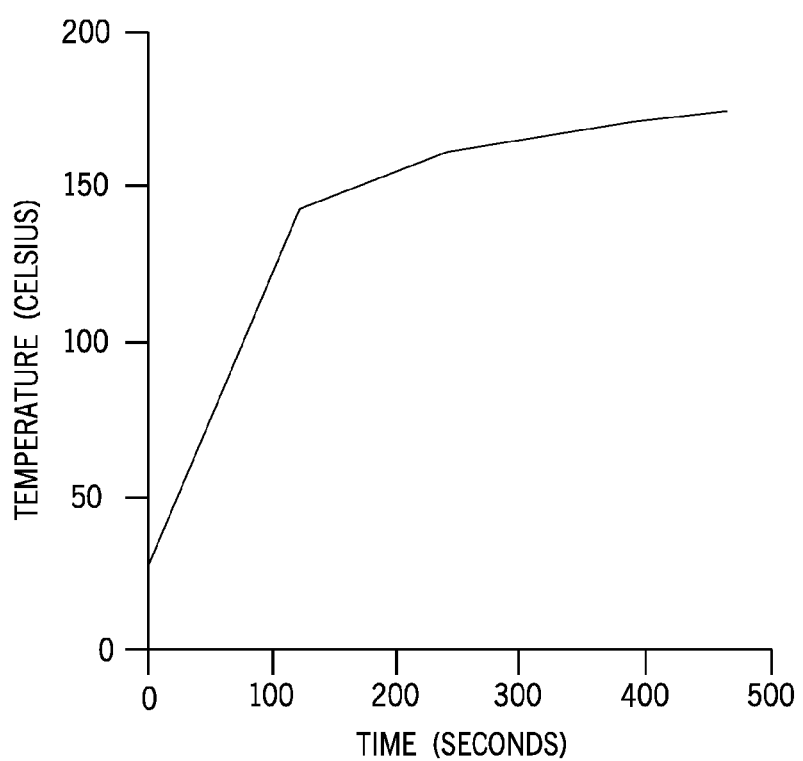
FIG. 1 shows heat kinetics of polyisocyanate foam polymerization. $T_{max}=174.2°$ C. at 464 seconds cure time.

Before any embodiments of the invention are explained in detail, it is to be understood that the invention is not limited in its application to the details of construction and the arrangement of components or steps set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

This disclosure provides a method for creating a surgical training model. The method can include the steps of: (a) providing a bony structure selected from a bone model or bone cadaveric tissue; (b) placing the bony structure in a cavity model that emulates an animal body cavity; and (c) forming a first layer in the cavity model, on top of the bony structure, wherein the first layer emulates one or more tissues of an animal musculoskeletal system. The bony structure can be selected from a bone model of one or more of the following: vertebrae, rib bones, scapula, clavicle, humerus, radius, ulna, metacarpals, phalanges, ilium, ischium, pubis, femur, patella, tibia, fibula, talus, metatarsals, skull, mandible, occipital, hyoid, sternum, sacrum and coccyx. In one embodiment, the bony structure can be selected from a spinal vertebrae model or spinal vertebrae cadaveric tissue. In one embodiment, the first layer can emulate an animal muscle tissue. In another embodiment, the first layer can emulate an animal ligament tissue. In another embodiment, the first layer can emulate an animal tendon tissue. In another embodiment, the first layer can emulate animal cartilage tissue.

In one embodiment, the animal body cavity is one of the following: an animal dorsal body cavity, an animal ventral body cavity, or an open animal body space created by a surgical incision. In another embodiment, the animal body cavity is one of the following: a spinal cavity, a cranial cavity, a thoracic cavity, an abdominal cavity, a pelvic cavity, or an open animal body space created by a surgical incision. In another embodiment, the animal body cavity is a spinal cavity. In another embodiment, the animal body cavity is a spinal cavity, and the first layer emulates an animal muscle tissue.

In one embodiment, the bony structure is a spinal vertebrae model and step (a) comprises 3D printing the spinal vertebrae model from a thermoplastic polymer. In another embodiment, the bony structure is a spinal vertebrae model, and step (a) comprises 3D printing the spinal vertebrae model from a thermoplastic polymer and infiltrating a foam filling into an interior space of the 3D printed spinal vertebrae model.

In one embodiment, the thermoplastic polymer has a tensile elastic modulus that is 10% to 100% of a value in a range of tensile elastic modulus properties for human cortical bone. In another embodiment, the thermoplastic polymer has a Shore D hardness that is 50% to 100% of a value in a range of Shore D hardness properties for human cortical bone. In another embodiment, the thermoplastic polymer has a Shore D hardness that is 75% to 100% of a value in a range of Shore D hardness properties for human cortical bone. In another embodiment, the thermoplastic polymer has a density that is 50% to 100% of a value in a range of density properties for human cortical bone. In another embodiment, the thermoplastic polymer has a density that is 75% to 100% of a value in a range of density properties for human cortical bone. In another embodiment, the thermoplastic polymer comprises acrylonitrile butadiene styrene (ABS). In one embodiment, the foam has a density that is 50% to 100% of a value in a range of density properties for human cancellous bone. In another embodiment, the foam has a density that is 75% to 100% of a value in a range of density properties for human cancellous bone. In another embodiment, the foam comprises polyurethane or polyester.

In one embodiment of the method, step (c) (i.e., forming a first layer in the cavity model on top of the bony structure) comprises: combining polyvinyl acetate, a source of sugar, a crystallization agent (which can promote crystallization of the polyvinyl acetate), and a basic catalyst (which can catalyze crosslinking of the polyvinyl acetate) to form a mixture, and placing the mixture on top of the bony structure, wherein the polyvinyl acetate is crosslinked thereby forming the first layer on top of the bony structure. In one embodiment of the method, the crystallization agent is an ionic salt of an alkali metal or an alkaline earth metal. In another embodiment, the crystallization agent is an alkali metal chloride or an alkaline earth chloride. In another embodiment, the crystallization agent is sodium chloride.

In one embodiment of the method, the basic catalyst is an ionic salt of an alkali metal or an alkaline earth metal. In another embodiment, the basic catalyst is an alkali metal carbonate or an alkali metal bicarbonate. In another embodiment, the basic catalyst is sodium bicarbonate.

In one embodiment of the method, the source of sugar is a syrup. In another embodiment, the syrup is selected from the group consisting of agave, barley malt, corn, high fructose corn, fruit syrup, glucose syrup, inverted sugar syrup, maple syrup, sugar beet syrup, and sorghum syrup. In another embodiment, the source of sugar is corn syrup. In another embodiment, the source of sugar is corn syrup, and the crystallization agent is sodium chloride, and the basic catalyst is sodium bicarbonate.

In one embodiment of the method, step (c) (i.e., forming a first layer in the cavity model on top of the bony structure) comprises: preparing a first mixture including polyvinyl acetate and a source of sugar, placing an amount of the first mixture on top of the bony structure, preparing a second mixture including a crystallization agent and a basic catalyst, and contacting the first mixture on top of the bony structure with the second mixture, wherein the polyvinyl acetate is crosslinked thereby forming the first layer on top of the bony structure. In one embodiment of the method, step (c) is repeated. In another embodiment, the second mixture is supersaturated.

One embodiment of the method further comprises step (d): placing a second layer over the first layer in the cavity model, wherein the second layer emulates an animal fat tissue. In another embodiment, step (d) comprises: combining a first mixture including polyvinyl acetate, and a second mixture including a crystallization agent and a basic catalyst wherein the polyvinyl acetate is crosslinked thereby forming the second layer. Step (d) can further comprise combining a pigment into the first mixture or the second mixture. In step (d), the crystallization agent can be an ionic salt of an alkali metal or an alkaline earth metal. In another embodiment, the crystallization agent is an alkali metal chloride or an alkaline earth chloride. In another embodiment, the crystallization agent is sodium chloride. In one embodiment, the basic catalyst is an ionic salt of an alkali metal or an alkaline earth metal. In another embodiment, the basic catalyst is an alkali metal carbonate or an alkali metal bicarbonate. In another embodiment, the basic catalyst is sodium bicarbonate. In one embodiment, step (d) comprises combining the first mixture and the second mixture in a volume ratio of 8 to 12 parts polyvinyl acetate:2 to 6 parts crystallization agent:3 to 7 parts basic catalyst. In another embodiment, the crystallization agent is sodium chloride, and the basic catalyst is sodium bicarbonate.

One embodiment of the method further comprises step (e): placing a third layer over the second layer in the cavity model, wherein the third layer emulates an animal skin tissue. Step (e) can comprise: saturating a piece of cotton fiber cloth with a first mixture including polyvinyl acetate; pouring a solution of a basic catalyst in a tray; laying the saturated cotton fiber cloth over the solution; pressing the saturated cotton fiber cloth into the solution on a first side of the cloth and a second side of the cloth; rinsing excess of the solution off of the saturated cotton fiber cloth; and drying the cotton fiber cloth to create the third layer. In one embodiment, the first mixture comprises a pigment. In another embodiment, the basic catalyst is an ionic salt of an alkali metal or an alkaline earth metal. In another embodiment, the basic catalyst is an alkali metal carbonate or an alkali metal bicarbonate. In another embodiment, the basic catalyst is sodium bicarbonate.

This disclosure also provides a surgical training model apparatus comprising: a cavity model that emulates an animal body cavity; a bone model placed in the cavity model, wherein the bone model is 3D printed from a thermoplastic polymer; and a first layer on top of the bone model, wherein the first layer emulates one or more tissues of an animal musculoskeletal system. In one embodiment, the bone model is selected from a model of one or more of the following: vertebrae, rib bones, scapula, clavicle, humerus, radius, ulna, metacarpals, phalanges, ilium, ischium, pubis, femur, patella, tibia, fibula, talus, metatarsals, skull, mandible, occipital, hyoid, sternum, sacrum and coccyx. In another embodiment, the bone model is a spinal vertebrae model. In one embodiment, the first layer emulates an animal muscle tissue. In another embodiment, the first layer emulates an animal ligament tissue. In another embodiment, the first layer emulates an animal tendon tissue. In another embodiment, the first layer emulates animal cartilage tissue.

In one embodiment, the animal body cavity is one of the following: an animal dorsal body cavity, an animal ventral body cavity, or an open animal body space created by a surgical incision. In another embodiment, the animal body cavity is one of the following: a spinal cavity, a cranial cavity, a thoracic cavity, an abdominal cavity, a pelvic cavity, or an open animal body space created by a surgical incision. In another embodiment, the animal body cavity is a spinal cavity. In another embodiment, the animal body cavity is a spinal cavity, and the first layer emulates an animal muscle tissue.

In one embodiment of the bone model of the apparatus, the thermoplastic polymer has a tensile elastic modulus that is 10% to 100% of a value in a range of tensile elastic modulus properties for human cortical bone. In one embodiment of the bone model of the apparatus, the thermoplastic polymer has a Shore D hardness that is 50% to 100% of a value in a range of Shore D hardness properties for human cortical bone. In one embodiment of the bone model of the apparatus, the thermoplastic polymer has a Shore D hardness that is 75% to 100% of a value in a range of Shore D hardness properties for human cortical bone. In one embodiment of the bone model of the apparatus, the thermoplastic polymer has a density that is 50% to 100% of a value in a range of density properties for human cortical bone. In one embodiment of the bone model of the apparatus, the thermoplastic polymer has a density that is 75% to 100% of a value in a range of density properties for human cortical bone. In one embodiment of the bone model of the apparatus, the thermoplastic polymer comprises acrylonitrile butadiene styrene (ABS).

In one embodiment, the bone model is a spinal vertebrae model, and the spinal vertebrae model includes a foam filling in an interior space of the 3D printed spinal vertebrae model. In one embodiment, the foam has a density that is 50% to 100% of a value in a range of density properties for human cancellous bone. In one embodiment, the foam has a density that is 75% to 100% of a value in a range of density properties for human cancellous bone. In another embodiment, the foam comprises polyurethane or polyester. In another embodiment, the foam comprises polyurethane.

In one embodiment of the apparatus, the first layer comprises a reaction product of polyvinyl acetate, a source of sugar, a crystallization agent (which can promote crystallization of the polyvinyl acetate), and a basic catalyst (which can catalyze crosslinking of the polyvinyl acetate). In one embodiment, the crystallization agent is an ionic salt of an alkali metal or an alkaline earth metal. In another embodiment, the crystallization agent is an alkali metal chloride or an alkaline earth chloride. In another embodiment, the crystallization agent is sodium chloride. In one embodiment, the basic catalyst is an ionic salt of an alkali metal or an alkaline earth metal. In another embodiment, the basic catalyst is an alkali metal carbonate or an alkali metal bicarbonate. In another embodiment, the basic catalyst is sodium bicarbonate. In one embodiment, the source of sugar is a syrup. In another embodiment, the syrup is selected from the group consisting of agave, barley malt, corn, high fructose corn, fruit syrup, glucose syrup, inverted sugar syrup, maple syrup, sugar beet syrup, and sorghum syrup. In another embodiment, the source of sugar is corn syrup. In another embodiment, the source of sugar is corn syrup, and the crystallization agent is sodium chloride, and the basic catalyst is sodium bicarbonate.

One embodiment of the apparatus further comprises a second layer in the cavity model, on top of the first layer, wherein the second layer emulates an animal fat tissue. In one embodiment, the second layer comprises a reaction product of polyvinyl acetate, a crystallization agent (which can promote crystallization of the polyvinyl acetate), and a basic catalyst (which can catalyze crosslinking of the polyvinyl acetate). In one embodiment, the crystallization agent is an ionic salt of an alkali metal or an alkaline earth metal. In another embodiment, the crystallization agent is an alkali metal chloride or an alkaline earth chloride. In another embodiment, the crystallization agent is sodium chloride. In one embodiment, the basic catalyst is an ionic salt of an alkali metal or an alkaline earth metal. In another embodiment, the basic catalyst is an alkali metal carbonate or an alkali metal bicarbonate. In another embodiment, the basic catalyst is sodium bicarbonate. In one embodiment, the second layer further includes a yellow pigment mimicking a color of animal fat tissue.

One embodiment of the apparatus further comprises a third layer in the cavity model, on top of the second layer, wherein the third layer emulates an animal skin tissue. In one embodiment, the third layer comprises cotton fiber cloth impregnated with a reaction product of polyvinyl acetate and a basic catalyst (which can catalyze crosslinking of the polyvinyl acetate). In one embodiment, the basic catalyst is an ionic salt of an alkali metal or an alkaline earth metal. In another embodiment, the basic catalyst is an alkali metal carbonate or an alkali metal bicarbonate. In another embodiment, the basic catalyst is sodium bicarbonate.

Figure 4A:
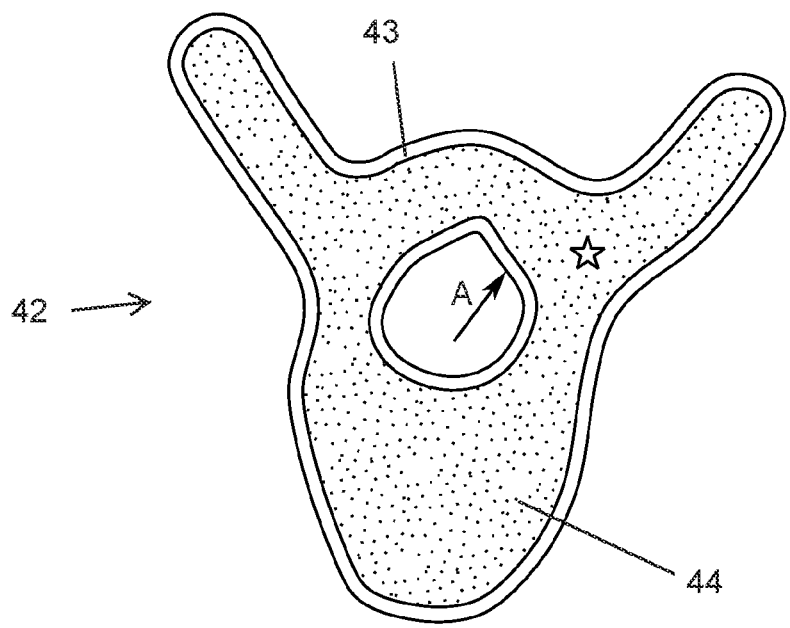
FIG. 4(a) shows a cross-section through a combined 3D printed ABS/injected polyisocyanate foam vertebral model. The foam generates a lower density, porous infill (star) compared with the thermoplastic "cortical" bone (arrow A).

This disclosure also provides a bone model comprising an outer structure 3D printed from a thermoplastic polymer, the outer structure defining an interior space; and a foam filling in the interior space. In one embodiment, the bone model is selected from a model of one or more of the following: vertebrae, rib bones, scapula, clavicle, humerus, radius, ulna, metacarpals, phalanges, ilium, ischium, pubis, femur, patella, tibia, fibula, talus, metatarsals, skull, mandible, occipital, hyoid, sternum, sacrum and coccyx. In a non-limiting example embodiment as shown in FIG. 4(a), the bone model is a spinal vertebrae model 42 having a 3D printed thermoplastic polymer outer structure 43 and an injected foam 44 filling in the space of the spinal vertebral model 42. The outer structure 43 simulates cortical bone, and the injected foam 44 simulates cancellous bone.

In one embodiment of the bone model (e.g., the spinal vertebral model 42), the 3D printed thermoplastic polymer has a tensile elastic modulus that is 10% to 100% of a value in a range of tensile elastic modulus properties for human cortical bone. In one embodiment of the bone model (e.g., the spinal vertebral model 42), the thermoplastic polymer has a Shore D hardness that is 50% to 100% of a value in a range of Shore D hardness properties for human cortical bone. In one embodiment of the bone model (e.g., the spinal vertebral model 42), the thermoplastic polymer has a Shore D hardness that is 75% to 100% of a value in a range of Shore D hardness properties for human cortical bone. In one embodiment of the bone model (e.g., the spinal vertebral model 42), the thermoplastic polymer has a density that is 50% to 100% of a value in a range of density properties for human cortical bone. In one embodiment of the bone model (e.g., the spinal vertebral model 42), the thermoplastic polymer has a density that is 75% to 100% of a value in a range of density properties for human cortical bone. In one embodiment of the bone model (e.g., the spinal vertebral model 42), the thermoplastic polymer comprises acrylonitrile butadiene styrene (ABS). In one embodiment of the bone model (e.g., the spinal vertebral model 42), the foam has a density that is 50% to 100% of a value in a range of density properties for human cancellous bone. In one embodiment of the bone model (e.g., the spinal vertebral model 42), the foam has a density that is 75% to 100% of a value in a range of density properties for human cancellous bone. In one embodiment of the bone model (e.g., the spinal vertebral model 42), the foam comprises polyurethane or polyester. In one embodiment of the bone model (e.g., the spinal vertebral model 42), the foam comprises polyurethane. In one embodiment of the bone model (e.g., the spinal vertebral model 42), a reaction temperature of the foam is less than a melting point of the thermoplastic polymer This disclosure also provides an article that emulates one or more tissues of an animal musculoskeletal system. The article comprises a reaction product of polyvinyl acetate, a source of sugar, a crystallization agent (which can promote crystallization of the polyvinyl acetate), and a basic catalyst (which can catalyze crosslinking of the polyvinyl acetate). In one embodiment, the article emulates an animal muscle tissue. In another embodiment, the article emulates an animal ligament tissue. In another embodiment, the article emulates an animal tendon tissue. In another embodiment, the article emulates animal cartilage tissue. In one embodiment, the crystallization agent is an ionic salt of an alkali metal or an alkaline earth metal. In another embodiment, the crystallization agent is an alkali metal chloride or an alkaline earth chloride. In another embodiment, the crystallization agent is sodium chloride. In one embodiment, the basic catalyst is an ionic salt of an alkali metal or an alkaline earth metal. In another embodiment, the basic catalyst is an alkali metal carbonate or an alkali metal bicarbonate. In another embodiment, the basic catalyst is sodium bicarbonate. In one embodiment, the source of sugar is a syrup. In another embodiment, the syrup is selected from the group consisting of agave, barley malt, corn, high fructose corn, fruit syrup, glucose syrup, inverted sugar syrup, maple syrup, sugar beet syrup, and sorghum syrup. In another embodiment, the source of sugar is corn syrup. In another embodiment, the source of sugar is corn syrup, and the crystallization agent is sodium chloride, and the basic catalyst is sodium bicarbonate.

This disclosure also provides an article that emulates an animal fat tissue. The article comprises a reaction product of polyvinyl acetate, a crystallization agent (which can promote crystallization of the polyvinyl acetate), and a basic catalyst (which can catalyze crosslinking of the polyvinyl acetate). In one embodiment, the crystallization agent is an ionic salt of an alkali metal or an alkaline earth metal. In another embodiment, the crystallization agent is an alkali metal chloride or an alkaline earth chloride. In another embodiment, the crystallization agent is sodium chloride. In another embodiment, the basic catalyst is an ionic salt of an alkali metal or an alkaline earth metal. In another embodiment, the basic catalyst is an alkali metal carbonate or an alkali metal bicarbonate. In another embodiment, the basic catalyst is sodium bicarbonate. In one embodiment, the article further includes a yellow pigment mimicking a color of animal fat tissue.

This disclosure also provides an article that emulates an animal skin tissue. The article comprises a fiber cloth impregnated with a reaction product of polyvinyl acetate and a basic catalyst (which can catalyze crosslinking of the polyvinyl acetate). In one embodiment, the basic catalyst is an ionic salt of an alkali metal or an alkaline earth metal. In another embodiment, the basic catalyst is an alkali metal carbonate or an alkali metal bicarbonate. In another embodiment, the basic catalyst is sodium bicarbonate.

In one non-limiting example embodiment, the method can comprise acquiring a spinal vertebrae structure selected from a spinal vertebrae model or spinal vertebrae cadaveric tissue, placing the spinal vertebrae structure in a cavity model that emulates an animal body cavity (e.g., a spinal cavity or an abdominal cavity); and forming a first layer in the cavity model, on top of the spinal vertebrae structure, wherein the first layer emulates one or more tissues of the animal musculoskeletal system, preferably wherein the first layer emulates an animal muscle tissue. The method can further comprise placing a second layer over the first layer in the cavity model, wherein the second layer emulates an animal fat tissue, and placing a third layer over the second layer in the cavity model, wherein the third layer emulates an animal skin tissue.

The spinal vertebrae structure can be a spinal vertebrae model 3D printed from a thermoplastic polymer and infiltrated with a foam filling into an interior space of the 3D printed spinal vertebrae model. The thermoplastic polymer may comprise acrylonitrile butadiene styrene (ABS). The foam may comprise polyurethane or polyester.

The step of forming the first layer (which can emulate an animal muscle tissue) includes pouring a layer of a first mixture including polyvinyl acetate and a source of sugar on top of the spinal vertebrae structure, and pouring a second mixture on the first mixture. The second mixture can be supersaturated. The second mixture can include (i) a first salt comprising an alkali metal chloride (which can promote crystallization of the polyvinyl acetate) and (ii) a second salt comprising an alkali metal carbonate or an alkali metal bicarbonate (which can catalyze crosslinking of the polyvinyl acetate). The step of forming the first layer can also include mixing the second mixture into the first mixture, and adding another thin layer of the second mixture until the first layer stiffens. The source of sugar can be a solution of sugar in water. The sugar can be a monosaccharide (e.g., glucose, fructose, galactose) or a disaccharide (e.g., sucrose, lactose, maltose). The source of sugar can be a syrup (i.e., a thick, viscous liquid comprising a solution of one or more sugars in water wherein the liquid has a higher viscosity than water). Non-limiting example syrups include agave syrup (which may include primarily fructose as the sugar), barley malt syrup (which includes primarily maltose as the sugar), corn syrup (which includes primarily glucose as the sugar), high fructose corn syrup (which includes fructose and glucose as the sugars), fruit syrup, glucose syrup, inverted sugar syrup, maple syrup (which includes primarily sucrose as the sugar), sugar beet syrup, and sorghum syrup. In one non-limiting example, the source of sugar can be a corn syrup. The first salt can be sodium chloride. The second salt can be sodium bicarbonate. These steps of forming the first layer can be repeated if desired.

The step of placing a second layer (which emulates an animal fat tissue) over the first layer in the cavity model can comprise combining a first mixture including polyvinyl acetate, and a second mixture. The second mixture can be supersaturated. The second mixture can include (i) a first salt comprising an alkali metal chloride (which can promote crystallization of the polyvinyl acetate) and (ii) a second salt comprising an alkali metal carbonate or an alkali metal bicarbonate (which can catalyze crosslinking of the polyvinyl acetate) to form the second layer. This step can also include combining a pigment into the first mixture or the second mixture. The first mixture and the second mixture can be combined in a volume ratio of 8 to 12 parts polyvinyl acetate:2 to 6 parts alkali metal chloride:3 to 7 parts alkali metal bicarbonate. The first mixture and the second mixture can be combined in a volume ratio of 10 parts polyvinyl acetate:4 parts alkali metal chloride:5 parts alkali metal bicarbonate. The first salt can be sodium chloride. The second salt can be sodium bicarbonate.

In any versions of the invention, the polyvinyl acetate (PVAc) can have a molecular weight such as that which is conventional with polyvinyl acetate glues. The molecular weight can be 500 to 200,000. The molecular weight of the polyvinyl acetate can also be from about 30,000 to 100,000 although higher or lower molecular weight resins can be used. As used herein, "molecular weight" is the weight average molecular weight (Mw). Although weight average molecular weight (Mw) can be determined in a variety of ways, with some differences in result depending upon the method employed, it is convenient to employ gel permeation chromatography. The polyvinyl acetate can be an emulsion that is a homopolymer dispersion with a total solids content of about 40% to 70% by weight of the polyvinyl acetate emulsion. The polyvinyl acetate may be in the form of a dispersion in water stabilized with hydroxyethylcellulose, dextrin, or polyvinyl alcohol.

The step of placing a third layer (which emulates an animal skin tissue) over the second layer in the cavity model can further comprise saturating a piece of cotton fiber cloth with a first mixture including polyvinyl acetate, pouring a solution of an alkali metal carbonate or alkali metal bicarbonate (which can catalyze crosslinking of the polyvinyl acetate) in a tray, and laying the saturated cotton fiber cloth over the solution. This step can also include pressing the saturated cotton fiber cloth into the solution on a first side of the cloth and a second side of the cloth, rinsing excess of the solution off of the saturated cotton fiber cloth, and drying the cotton fiber cloth. The first mixture can comprise a pigment. The solution can comprise sodium bicarbonate.

A surgical training model apparatus according to one non-limiting example embodiment of the invention can comprise an cavity model that emulates an animal body cavity (e.g., a spinal cavity or an abdominal cavity), a spinal vertebrae structure placed in the center of the cavity model wherein the spinal vertebrae structure is selected from a spinal vertebrae model or spinal vertebrae cadaveric tissue, and a first layer in the cavity model, on top of the vertebrae. The first layer emulates one or more tissues of the animal musculoskeletal system, preferably wherein the first layer emulates an animal muscle tissue. The apparatus can further comprise a second layer in the cavity model, on top of the first layer, and a third layer in the cavity model, on top of the second layer. The second layer can emulate an animal fat tissue. The third layer can emulate an animal skin tissue. The spinal vertebrae structure can be 3D printed from a thermoplastic polymer and infiltrated with a foam filling into an interior space of the 3D printed spinal vertebrae. The thermoplastic polymer can comprise acrylonitrile butadiene styrene (ABS). The foam can be polyurethane or polyester.

The first layer (which can emulate an animal muscle tissue) can comprise a reaction product of a first mixture including polyvinyl acetate and a source of sugar, and a second mixture. The second mixture can include (i) a first salt comprising an alkali metal chloride (which can promote crystallization of the polyvinyl acetate) and (ii) a second salt comprising an alkali metal carbonate or an alkali metal bicarbonate (which can catalyze crosslinking of the polyvinyl acetate). The source of sugar can be a solution of sugar in water. The sugar can be a monosaccharide (e.g., glucose, fructose, galactose) or a disaccharide (e.g., sucrose, lactose, maltose). The source of sugar can be a syrup (i.e., a thick, viscous liquid comprising a solution of one or more sugars in water wherein the liquid has a higher viscosity than water). Non-limiting example syrups include agave syrup (which may include primarily fructose as the sugar), barley malt syrup (which includes primarily maltose as the sugar), corn syrup (which includes primarily glucose as the sugar), high fructose corn syrup (which includes fructose and glucose as the sugars), fruit syrup, glucose syrup, inverted sugar syrup, maple syrup (which includes primarily sucrose as the sugar), sugar beet syrup, and sorghum syrup. In one non-limiting example, the source of sugar can be a corn syrup. The first salt can be sodium chloride. The second salt can be sodium bicarbonate.

The second layer (which can emulate an animal fat tissue) can comprise a reaction product of a first mixture including polyvinyl acetate, and a second mixture. The second mixture can include (i) a first salt comprising an alkali metal chloride (which can promote crystallization of the polyvinyl acetate) and (ii) a second salt comprising an alkali metal carbonate or an alkali metal bicarbonate (which can catalyze crosslinking of the polyvinyl acetate). Again, the first salt can be sodium chloride. The second salt can be sodium bicarbonate. The second layer further can also include a yellow pigment mimicking a color of animal fat tissue.

The third layer (which can emulate an animal skin tissue) can comprise a cotton fiber cloth impregnated with a reaction product of a first mixture including polyvinyl acetate, and a second mixture including a salt comprising an alkali metal carbonate or an alkali metal bicarbonate (which can catalyze crosslinking of the polyvinyl acetate). The salt can be sodium bicarbonate.

EXAMPLES

The following Examples are provided to demonstrate and further illustrate certain embodiments and aspects of the present invention and are not to be construed as limiting the scope of the invention.

Example 1

Investigation and Feasibility of Combined 3D Printed Thermoplastic Filament and Polymeric Foam to Simulate the Cortiocancellous Interface of Human Vertebrae Overview Disorders of the spine are among the most common indications for neurosurgical and orthopedic surgical interventions. Spinal fixation in the form of pedicle screw placement is a common form of instrumentation method in the lower cervical, thoracic, and lumbar spine. A vital principle to understand for the safe and accurate placement of pedicle screws is the palpable difference between the cortical and cancellous bone, both of which have different material properties and compositions. Probing and palpation of the hard cortical bone, also known as the "ventral lamina", covering the neural elements of the spinal canal during screw placement provides manual feedback to the surgeon, indicating an impending breach if continued directional force is applied. Generally, this practice is learned at the expense of patients in live operating room scenarios. Currently, there is a paucity of human vertebrae simulation designs that have been validated based on the in vivo ultrastructure and physical properties of human cortical and cancellous bone. In this study, we examined the feasibility of combining three-dimensionally printed thermoplastic polymers with polymeric foam to replicate both the vertebral corticocancellous interface and surface anatomy for procedural education.

Introduction

Back pain from spinal disorders is one of the most common diagnoses in medicine [Ref. 1-3]. The number of spinal surgeries has significantly increased over the last decade, and spinal fixation in the form of pedicle screw placement is a common procedure for lower cervical, thoracic, and lumbar instrumentation [Ref. 4].

Mastering pedicle screw insertion techniques is a vital component of both neurosurgical and orthopedic training programs [Ref. 5, 6]. Safe pedicle screw placement revolves around a comprehensive knowledge of pedicle anatomy in relation to the surrounding neurovascular structures [Ref. 7]. Case volume and quality among training programs are highly variable both in the United States and the world, which can significantly affect exposure and competency regarding these techniques [Ref. 8-10]. Two common adjuncts to surgical educational curricula include cadaveric models and simulation [Ref. 11-20]. The use of cadaveric tissue is fraught with variability in specimen quality, accessibility, and cost [Ref. 21-23]. In addition, many institutions are not able to facilitate human tissue specimens due to complex housing and personnel requirements for human tissue storage. In order to mitigate these limitations, simulation has become a popular method of alternate surgical education. Three-dimensional (3D) printing has been utilized for accurate replication of spinal anatomical features [Ref. 24-30]. Multiple material printing, polyurethane injection molds, and virtual reality programs have also been investigated for replication of the corticocancellous interface for pedicle screw insertion training [Ref. 16, 31]. Other studies have investigated varying thermoplastic filament infill percentages to provide a palpable difference during simulated cancellous access [Ref. 32]. Although biomechanical investigations have been explored on these single material models, replicating the granular details of cortical and cancellous material properties and composition has had limited investigation. There is significant variability in the histologic microstructure of cortical and cancellous bone, especially in the porosity index, which is considerably higher in cancellous bone [Ref. 33-38]. Polyurethane foams have been investigated with regards to biomechanical properties analogous to human vertebrae, however this has mainly been performed with a single foam material and with injection molding processes that have considerably less ability to replicate patient and disease specific anatomical features of vertebral elements than 3D printing [Ref. 31, 39]. To our knowledge, there has not been an investigation of the feasibility of combining multiple polymeric materials with 3D printing techniques to replicate the ultrastructure of vertebral bone. Our hypothesis for this study was that combining 3D printed thermoplastic vertebral model shells and polymeric foam would be a feasible methodology for simulating corticocancellous bone. The compatibility of these unique models with standard spinal surgical instruments and instrumentation methods were also investigated, along with the cost of model production.

Methods

Materials

In this feasibility experiment, we utilized 3D printed additive manufacturing techniques to produce the vertebral models. An Ultimaker S5 Dual Extrusion 3D printer (Ultimaker; Utrecht, Netherlands) was used to produce all 3D printed materials. This is a desktop Fused Deposition Modeling (FDM) 3D printer with total dimensions of 495×457× 520 mm that is commercially available for ~US$4999.99. Specifications include a dual printer head for a two-nozzle system which allows simultaneous multiple material printing, a XYZ build volume of 330×240×300 mm, XYZ resolution of 6.9×6.9×6.9 µm, and maximum build speed of 24 mm$^3$/sec. The two thermoplastic filaments investigated for feasible compatibility with the polymeric foam were acrylonitrile butadiene styrene (ABS) and polylactic acid (PLA). These were chosen due to their comparable material properties with human cortical bone as previously investigated by Bohl et al. and Hao et al. [Ref. 28, 29, 40]. The 2.85 mm diameter ABS filament had a melting temperature range of 225-245° Centigrade (C), tensile modulus of 2,030 MPa, 34% elongation at break, Shore D hardness of 76, melt mass-flow rate (MFR) of 41 g/10 minutes at 260° C., density of 1.04 g/cm$^3$. The 2.85 mm PLA filament had a density of 1.25 g/cm$^3$, melting temperature of 45-160° C., tensile modulus of 2,346.5 MPa, 5.2% elongation at break, Shore D hardness of 83, MFR of 6.09 g/10 minutes at 210° C. Values for the tensile modulus of elasticity for cortical bone have been reported to be in a range of 11.0 GPa to 20.0 GPa (see http://www.matweb.com). In another study, values for the tensile modulus of elasticity for cortical bone have been reported to be 17.7±3.9 (see Chong et al., *Journal of Biomechanical Engineering*, August 2007, Vol. 129, pages 489-493). Values for the Shore D hardness for human cortical bone have been reported to be in a range of 85 to 95 (see https://www.bonesim.com/products_and_properties). Values for the density for human cortical bone have been reported to be in a range of 1.4 g/cm$^3$ to 1.9 g/cm$^3$ (see https://www.bonesim.com/products_and_properties).

Polymeric Foam Production and Thermal Investigation

Polymeric foam was used to investigate the compatibility with thermoplastic polymers to represent the corticocancellous interface. Polymeric foam has been shown to be a useful method of recreating trabecular bone due to its porosity and density properties which can be manipulated based upon polymerization environment [Ref. 41-43]. The foam components were acquired in a two-part mixture (Parts A & B) directly from the manufacturer (Smooth-On; East Texas, PA). Part A consists of a proprietary mixture of 4,4' methylene bis (phenylisocyanate), benzene, 1,1'-methylenebis[4-isocyanato-], and methylenediphenyl disocyanate. Part B contains a proprietary aqueous surfactant mixture that catalyzes polymerization of Part A to polyisocyanate with chemical foaming when mixed in a 1:1 ratio and stirred for 30 seconds. The foam becomes porous due to chemical blowing from carbon dioxide byproducts that create microscopic and macroscopic cavities within the polymeric product. The mixed components have a pot life of 90 seconds before curing begins, with full cure time ~120 minutes. Expansile volume is 400%, with a density of 0.25 g/cm$^3$ after full cure, which is similar to human cancellous bone [Ref. 44]. Values for the density for human cancellous bone have been reported to be in a range of 0.3 g/cm$^3$ to 1.2 g/cm$^3$ (see https://www.bonesim.com/products_and_properties). Values for the Shore D hardness for human cancellous bone have been reported to be in a range of 35 to 80 (see https://www.bonesim.com/products_and_properties). In another study, values for the density for human cancellous bone have been reported to be in a range of 0.09 g/cm$^3$ to 0.64 g/cm$^3$ and values for the apparent modulus for human cancellous bone have been reported to be 26 MPa to 673 MPa (see U.S. Pat. No. 8,568,148).

Combining Part A and Part B produces an exothermic polymerization reaction [Ref. 45]. The exothermic nature of the reaction limits the ability combine the foam with thermoplastic polymers if the reaction temperature reaches the chosen thermoplastic's melting point, which would distort the architecture of the 3D printed models. Investigation of the standalone baseline and maximum temperature range during polymerization was performed using a digital thermometer (Taylor LED Stem Thermometer, Taylor Precision Products; Oak Brook, IL) with a temperature range of −40° C. to 232° C. Twenty (20) ml of Part A and 20 ml of Part B was placed into a 50 ml plastic container and mixed vigorously for 30 seconds as per the manufacturer. Initial temperature readings ($T_0$) were recorded, and temperature documentation was recorded at 2-minute intervals until maximum temperature ($T_{max}$) was reached. $T_{max}$ was defined as the maximum temperature recorded in the polymerized foam before a decrease in temperature was identified.

Vertebral Model Production

With institutional IRB approval, a CT (computed tomography) scan of an adult patient with 1-millimeter (mm) slice thickness was acquired from an anonymized, encrypted institutional database which does not record identifiable patient information. Patient anonymized DICOM (Digital Information and Communications in Medicine) data is deposited into the database after signed consent, and unable to be linked to identifiable information. The completely anonymized DICOM files were downloaded onto an encrypted hard drive and reviewed for inclusion criteria. CT reviewing was performed by three individuals (WC, AD, KF) on 3D Slicer (Slicer, v. 4.10.2, 2018). Criteria for inclusion of DICOM data were: inclusion of a complete vertebral column in the study, no surgical spinal instrumentation present on the CT, and no traumatic or iatrogenic deformity of the native anatomy (including previous laminectomy or disruption of posterior elements). Slice-based thresholding was then applied to the CT DICOM files with a range of 193-3000 Hounsfield Units. This particular range established the boundaries of the desired vertebrae in this particular DICOM data set. The vertebral interfaces were manually segmented in each individual CT slice in order to establish maximum accuracy of the vertebral bony associations. The thresholding and segmentation processes were performed by two individuals (WC and AD) with equally divided data sets, and quality and inclusion of thresholded anatomical structures was inspected on each slice by the opposite individual. Both individuals have extensive experience in thresholding and segmentation of anatomical structures using 3D Slicer, and independent assessment of data sets was performed to minimize observer bias. This workflow in combination with 1 mm DICOM CT slice thickness has been shown to be a highly accurate means of recreating spinal anatomic features with 3D printing [Ref. 46]. The finalized selections were inspected in a three-dimensional projection within 3D Slicer, rendered to STL (Standard Tessellation Language) format, and then edited for manifold assurance using Meshmixer (Autodesk, 2017). Cura (v.4.0, Ultimaker, Netherlands) software was used for slicing and production of the models. The STL files are loaded onto the virtual software platform in Cura and spatially arranged for maximum printer efficiency. A 1 mm outer shell with 0% infill is used to produce hollow models that can be filled with the polymeric foam. We chose a 1 mm shell in order to replicate the average thickness range of cortical bone in the human vertebrae [Ref. 44]. ABS filament at a diameter of 2.85±0.05 mm is printed through a 0.4 mm nozzle at a bed temperature of 80° C., nozzle temperature 250° C., and nozzle extrusion speed of 70 mm/sec. PLA filament at a diameter of 2.85±0.05 mm is printed through a 0.4 mm nozzle at a bed temperature of 80° C., nozzle temperature 200° C., and nozzle extrusion speed of 70 mm/sec. ABS and PLA cost expenditure is approximately $0.02 per gram or $0.46 per meter.

Combining 3D Printed Models with Polymeric Foam

The hollow 3D printed vertebral models are secured and a 5 mm×5 mm opening is drilled in the anterior portion of the vertebral body. The total volume of the desired vertebral model(s) was calculated using a volume rendering and analysis module within Meshmixer. The total volume is rounded to the nearest $cm^3$, and divided by 4 in order to determine the amount of initial liquid foam mixture to be inserted into each model for complete filling of simulated cancellous bone without excessive foam spillage and distortion of the printed model external features. Part A and Part B of the foam reactants are mixed in a 1:1 ratio with a total volume equal to ¼ of the total volume of the 3D printed models in order to account for the 400% increase in volume after complete curing, where:

Part $A$ (ml)+Part $B$ (ml)=(Total Calculated Volume of 3D Printed Model)/4

The calculated volume is injected into the vertebral model through the drilled hole with a standard syringe, and allowed to set for the complete cure time of 2 hours before use. Ambient conditions are in the range of 20-23° C. during curing with 40-60% humidity, inside a facility with air exchange protocol of 23 times per hour in order to limit inhalation of gaseous byproducts [Ref. 47]. After the allotted cure time, the models are inspected for any deformities or anatomical distortions from the exothermic polymerization of the polyisocyanate foam. Excess foam is trimmed with standard diagonal cutting pliers.

Results

We began by selecting a two-part porous polyisocyanate foam which has a complete cure density value range of 0.25 $g/cm^3$, which falls within the density range of human cancellous bone in radiographic and cadaveric studies [Ref. 48]. This foam creates a strong exothermic reaction during polymerization, thus limiting the compatibility and number of feasible thermoplastic material combinations [Ref. 45]. In order to investigate the exothermic properties of the selected foam during the polymerization process, 20 ml of Part A and 20 ml of Part B were mixed together in a 50 ml open container with digital recording of temperature changes. The maximum temperature recorded was 174.2° C. during this initial test. The results are demonstrated in FIG. 1 which shows heat kinetics of polyisocyanate foam polymerization. $T_{max}$=174.2° C. at 464 seconds cure time.

We selected two inexpensive and commonly used thermoplastic polymer 3D print filaments to simulate the cortical vertebral bone "shell": polylactic acid (PLA) and acrylonitrile butadiene styrene (ABS), which have densities of 1.25 $g/cm^3$ and 1.04 $g/cm^3$, respectively. Their Shore D hardness values are 76 and 83, respectively. These filaments were chosen for their hardness and density values which fall in the range of previously investigated radiographic and cadaveric human cortical bone measurements [Ref. 34, 49, 50].

Figure 2:
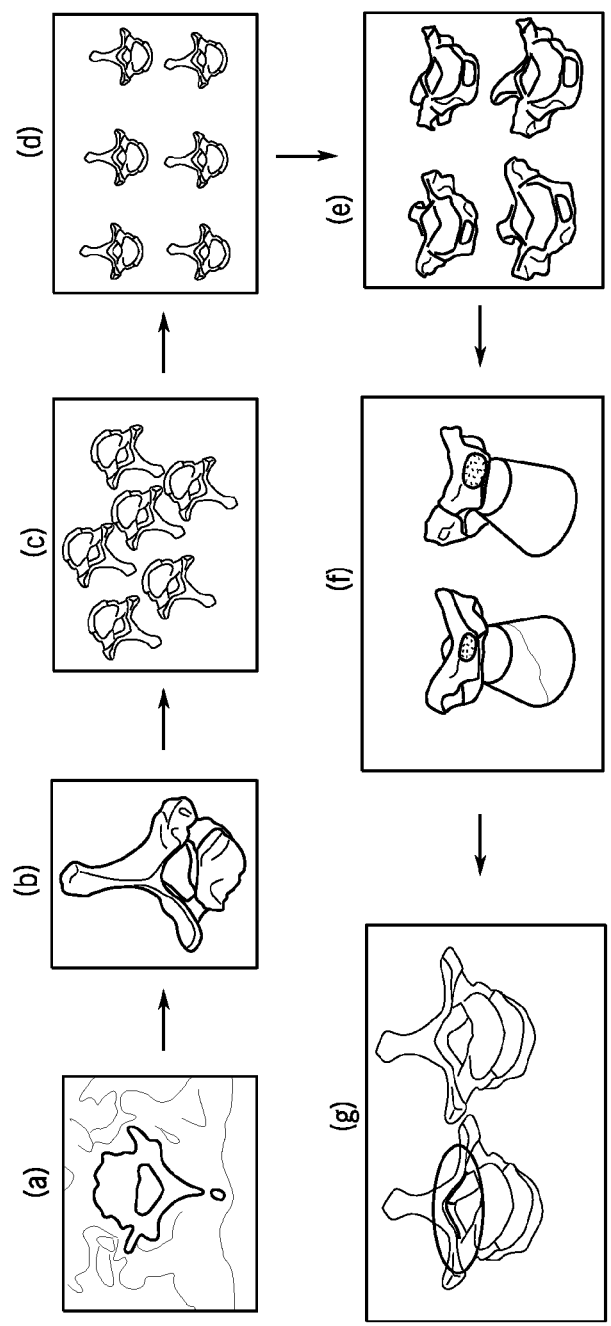
FIG. 2 shows workflow of DICOM in panel (a) to STL in panels (b,c) to ABS/PLA vertebral model production in panels (d,e) and feasibility of combination with polymeric foam in panel (f). The PLA model showed anatomic integrity failure (black circle) after foam injection due to the exothermic polymerization reaction in panel (g), whereas the ABS model did not change in external shape.

The compatibility of the polymeric foam within 3D printed vertebral models was tested. In order to perform this, anonymized DICOM (Digital Imaging and Communications in Medicine) files were acquired through encrypted institutional software. A C7 vertebral STL file was created for initial polymer compatibility testing. This particular vertebra was chosen as an initial test model due to its complex anatomical features and small pedicle dimensions relative to other human vertebrae, which would require complete retention of external anatomic fidelity after foam insertion in order to use successfully as an educational tool. Six identical C7 vertebral STL files were uploaded into the slicing software and printed successfully on a dual extrusion (multi-material) desktop FDM (Fused Deposition Modeling) printer (see FIG. 2). FIG. 2 shows workflow of DICOM in panel (a) to STL in panels (b,c) to ABS/PLA vertebral model production in panels (d,e) and feasibility of combination with polymeric foam in panel (f). The PLA model showed anatomic integrity failure (black circle) after foam injection due to the exothermic polymerization reaction in panel (g), whereas the ABS model did not change in external shape.

Each individual STL file volume was calculated using volumetric analysis in Meshmixer software 18.65 $cm^3$. Two 0.4 mm diameter nozzles were used for PLA and ABS filament extrusion simultaneously to produce three PLA and three ABS C7 vertebral printed models for the feasibility study. The 3 PLA models were printed at a nozzle temperature of 200° C., bed temperature 80° C., and nozzle speed of 70 mm/sec. The three ABS models were printed at a nozzle temperature of 250° C., bed temperature 80° C., and a nozzle speed of 70 mm/sec. Total print time for production of models was 18 hours and 4 minutes. Total PLA material consumption was 4.59 meters (36 grams), and total ABS material consumption was 4.06 meters (28 grams).

The C7 vertebral models were divided into two groups: an ABS group and PLA group according to the material properties. A 5 mm×5 mm hole was drilled in the anterior portion of the vertebral body to gain access to the inner portion for filling with the foam liquid mixture. A total of 5 ml of combined Part A and Part B were injected into each individual PLA and ABS C7 models according to volumetric calculations to fully accommodate the 400% increase in volume at full cure. The models were allowed to fully cure for 120 minutes per manufacturer specifications, and each model was inspected for any anatomic deformity that had occurred during the foam curing process. The three ABS models demonstrated no deformity after full cure time. The three PLA models demonstrated significant anatomic deformation which compromised model anatomic integrity. This observed result was consistent with our pre-combination thermal recordings of exothermic foam polymerization, which greatly exceeded the melting temperature range of PLA.

Figure 3A:
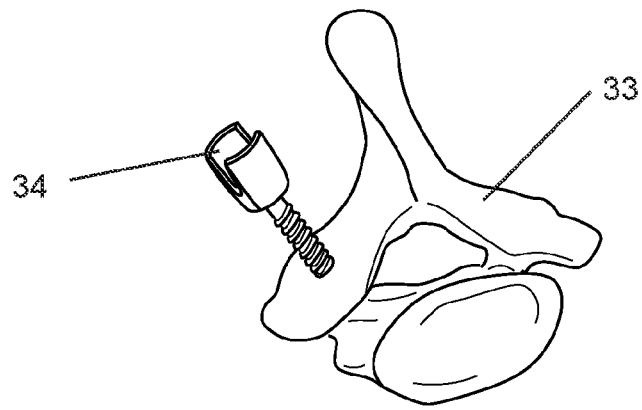
FIG. 3(a) shows instrumentation and validation of combined material C7 vertebral models with 4.0×26 mm screws.
Figure 3B:
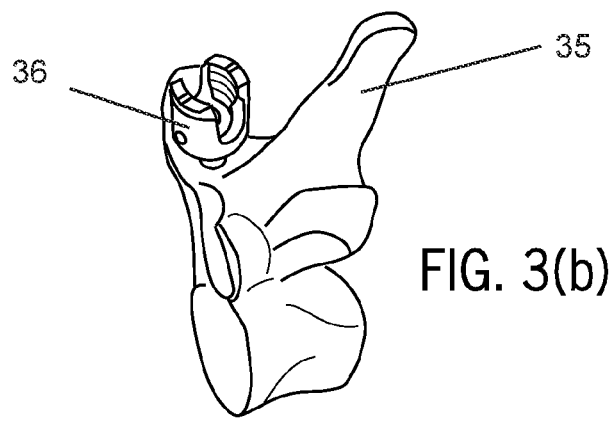
FIG. 3(b) shows instrumentation and validation of combined material T6 vertebral models with 6.0×45 mm screws.
Figure 3C:
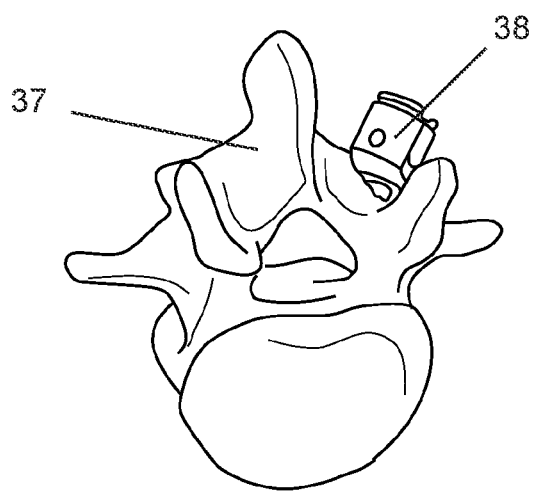
FIG. 3(c) shows instrumentation and validation of combined material L5 vertebral models with 8.0×50 mm screws.

In order to assess compatibility with standard spine surgical equipment and instrumentation and validate the combined polymer models for simulation of different vertebral levels, sixty ABS vertebral models of representative cervical, thoracic, and lumbar levels (20 C7, 20 T6, and 20 L5) were produced using the same software and additive manufacturing process. These vertebral models were chosen due to their representative structural architecture of pedicle and posterior element anatomy for the cervical, thoracic, and lumbar spine. The printed hollow models were filled with polyisocyanate liquid foam according to volumetric proportions as previously described and allowed to fully cure. A board-eligible neurosurgical spine fellow (WC) with over 1000-case experience in spinal surgery and instrumentation performed pedicle screw insertion of each vertebral model using standard freehand technique. A total of 120 pedicle screws were placed in the ABS/polymeric foam models. The C7 models were instrumented with 4.0×26 mm screws, T6 models with 6.0×45 mm screws, and L5 models with 8.0×50 mm screws (see FIGS. 3(a), 3(b), 3(c)). FIG. 3(a) shows instrumentation and validation of combined material C7 vertebral models 33 with 4.0×26 mm screws 34. FIG. 3(b) shows instrumentation and validation of combined material T6 vertebral models 35 with 6.0×45 mm screws 36. FIG. 3(c) shows instrumentation and validation of combined material L5 vertebral models 37 with 8.0×50 mm screws 38.

Models were assessed for integrity after pedicle probing, tapping, and screw placement. Model failure was defined as breaking, splitting, or cracking of the model during standard instrumentation. The results are listed in Table 1.

TABLE 1

Vertebral model integrity rate after instrumentation

| Vertebral Model | Pedicle Screw Size | Number of Pedicle Screws Inserted | Model Integrity Rate |
| --- | --- | --- | --- |
| C7 (n = 20) | 4.0 × 26 mm | 40 | 100% |
| T6 (n = 20) | 6.0 × 45 mm | 40 | 100% |
| L5 (n = 20) | 8.0 × 50 mm | 40 | 93% |

There were no model failures during pedicle probing or tapping. There were 3 pedicle breakages during instrumentation of L5 vertebral models due to technique error (screws placed laterally in each of the three instances), otherwise there were no model failures during pedicle screw placement. The cost of each combined material vertebral model was calculated by adding the cost of ABS material use (~$0.02/g) to the cost of liquid polymeric foam (~$0.03/ml) The cost of each model production is listed in Table 2. Model costs were inexpensive. The L5 vertebral model cost was twice that of C7 and T6 due to the larger vertebral size and increased volume of liquid foam required, but still remained much less than $1 in total production cost.

TABLE 2

Cost, material usage, and production time of individual combined-material vertebral models

| Vertebral Model | ABS Material Use (g) | Print Time per Model (hr:min) | Liquid Foam Use (ml) | Estimated Cost per Combined Material Model ($) |
| --- | --- | --- | --- | --- |
| C7 | 7 g | 2:46 | 5 ml | $0.29 |
| T6 | 7 g | 2:45 | 5 ml | $0.29 |
| L5 | 15 g | 4:12 | 10 ml | $0.60 |

Discussion

The results of this study indicate that the heat generated from the chemical polymerization of polyisocyanate foam exceeds the melting range of PLA, thus limiting compatibility for material combination for accurate anatomical model of external vertebral features. ABS has a much higher melting point range than PLA, but also falls within the density range of human cortical bone [Ref. 34]. ABS has also demonstrated comparable haptic feedback to human cortical bone during drilling exercises and objective measurements [Ref. 40]. ABS is a viable choice for FDM filament use in creating 3D printed vertebral shells for combination with polymeric foam to replicate the corticocancellous interface. This is applicable for cervical, thoracic, and lumbar 3D printed models according to our validation through instrumentation and screw placement in representative anatomical prototypes. Polymeric foam has been previously investigated to simulate cancellous bone for radiographic and surgical education purposes [Ref. 51, 52]. Polyurethane, porous bone cement, and low-density polyethylene have also been used to replicate the mechanical and material properties of trabecular bone [Ref. 53]. The corticocancellous interface has also been simulated using polymeric foam combined with carbon fiber reinforced epoxy to provide a two-material model for surgical and biomechanical demonstration, and have been shown to adequately replicate the mechanical properties of human bone [Ref. 54]. Despite the mechanical fidelity of these models, the accuracy of using injection molding processes alone for replication of the fine details of surface anatomy for the human spine has been shown to be inferior to rapid prototyping techniques [Ref. 24]. By combining the accuracy of 3D printing with the mechanical and material properties of thermoplastic filament and polymeric foam, the advantages of both materials can be used to create an innovative simulation for spinal instrumentation.

The ability to easily and cost-effectively combine multiple polymeric materials with extrinsic and intrinsic properties analogous to representative anatomical structures has important implications for orthopedic and neurosurgical training, biomechanical investigations, and instrumentation assessment. Desktop FDM 3D printing is cost-effective, easy to implement in an education program, and has been shown to provide highly accurate (micron level) detail of external anatomical features [Ref. 55]. However, the singular use of this technology to recreate the histological material properties of human vertebrae falls short in limited material selection as well as feasibility for multiple material combinations [Ref. 28]. This printing method has been explored in previous investigations, with some promise of biomechanical comparability to human vertebrae [Ref. 24, 28, 56]. However, the porosity of the matrixed infill and the physical material specifications of simulated cancellous bone have not currently been able to be accurately replicated with thermoplastic 3D printing alone. Polyurethane foams have been shown to accurately replicate cancellous bone both in material properties and in porous structural composition [Ref. 57]. This experiment showed that by combining ABS 3D printed thermoplastic filament with porous polymeric foam, an anatomically and structurally accurate vertebral model for demonstration and practice of spinal instrumentation skills can be constructed (see FIGS. 4(a), 4(b), 5(a), and 5(b)).

Figure 4B:
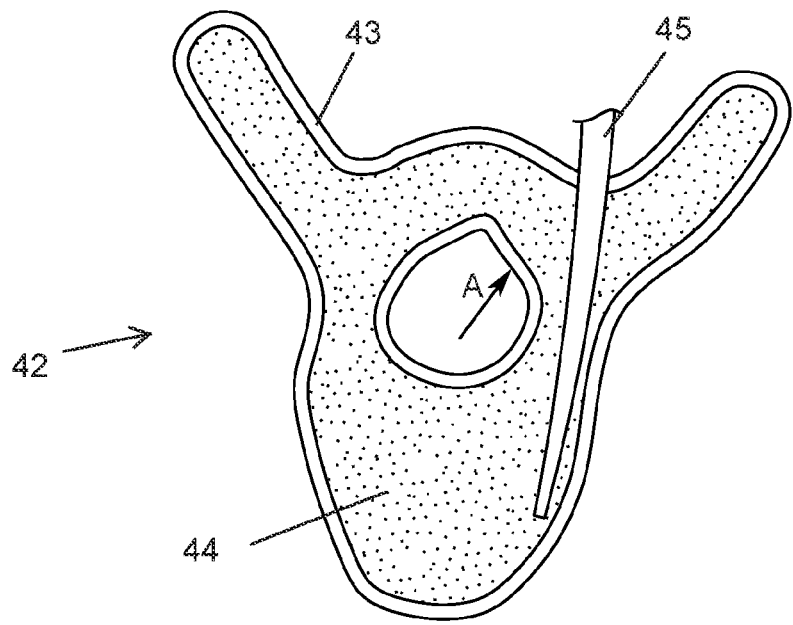
FIG. 4(b) shows a cross-section through a combined 3D printed ABS/injected polyisocyanate foam vertebral model. A curved pedicle probe can be inserted into the porous foam matrix in the same manner as in vivo for creation of a safe pedicle trajectory into the vertebral body.

FIG. 4(a) shows a cross-section through a combined 3D printed ABS outer structure 43 and injected polyisocyanate foam interior 44 of the vertebral model 42. The foam 44 generates a lower density, porous infill (star) compared with the thermoplastic ABS outer structure 43 "cortical" bone (arrow A). FIG. 4(b) shows a cross-section through the combined 3D printed ABS outer structure 43 and injected polyisocyanate foam interior 44 of the vertebral model 42. A curved pedicle probe 45 can be inserted into the porous foam matrix 44 in the same manner as in vivo for creation of a safe pedicle trajectory into the vertebral body 42.

Figure 5A:
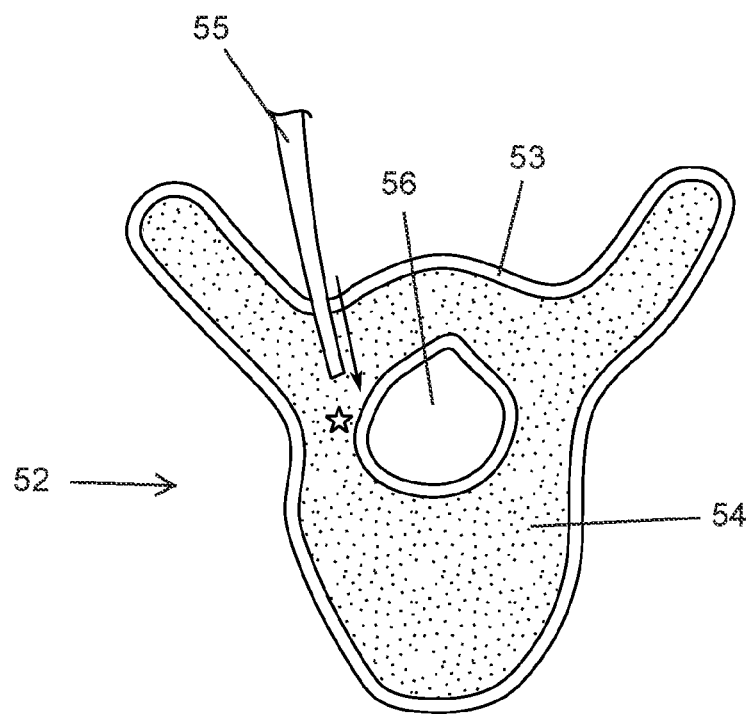
FIG. 5(a) shows demonstration of learning the ventral lamina concept. The higher density ABS 3D printed thermoplastic outer boundary of the spinal canal (star) can be palpated during pedicle probing, simulating cortical bone.
Figure 5B:
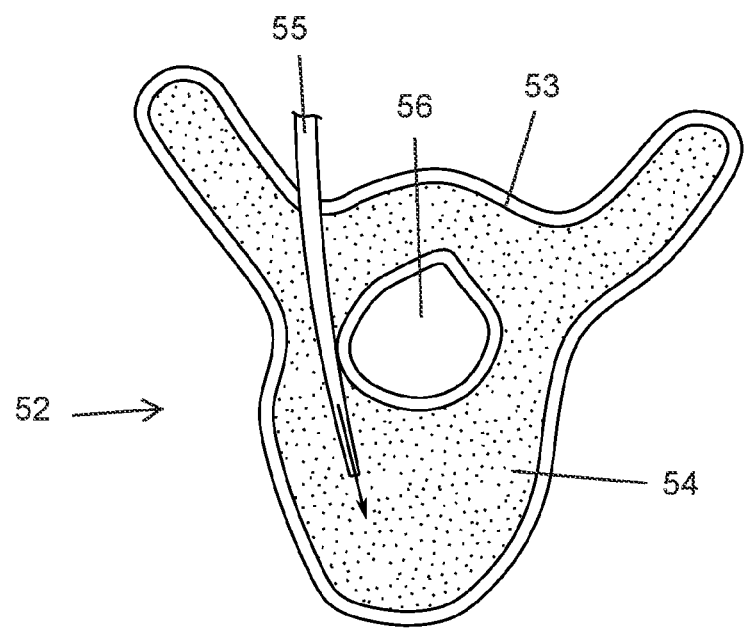
FIG. 5(b) shows demonstration of learning the ventral lamina concept. The angle of pedicle probe insertion can then be adjusted (black arrow) to fall within the less dense simulated cancellous bone in order to avoid a breach into the spinal canal. This biomimetic model provides a reproducible and potent learning tool for spine surgical trainees to understand haptic principles of vital spine surgical techniques.

FIG. 5(a) shows demonstration of learning the ventral lamina concept. The higher density ABS 3D printed thermoplastic outer structure 53 of the spinal canal (star) can be palpated during pedicle probing, simulating cortical bone. FIG. 5(b) also shows demonstration of learning the ventral lamina concept. The angle of pedicle probe 55 insertion can then be adjusted (black arrow) to fall within the less dense simulated cancellous bone foam 54 in order to avoid a breach into the spinal canal 56. This biomimetic vertebral model 52 provides a reproducible and potent learning tool for spine surgical trainees to understand haptic principles of vital spine surgical techniques.

During pedicle probing, the trabecular and cortical bone interface is accessed for demonstration of the cancellous channel in which the posterior spinal elements connect to the vertebral body. An important anatomical concept to understand for safe screw placement, first described by Lehman et al. is the "ventral lamina", or the cortical bone covering the spinal canal and contiguous with the medial pedicle wall [Ref. 58]. The ventral lamina is composed of dense cortical bone and can be felt during pedicle probing and screw insertion in order to gauge the limits of the pedicle boundaries. Recognition of this landmark is vital for safe placement of pedicle screws, as identification of the dense cortical bone during pedicle probing gives palpable feedback to the operator, in which further insertion of the instrument may result in pedicle violation. The haptic feedback of ventral lamina palpation is classically learned through experience in residency or fellowship training programs in operating scenarios on live patients [Ref. 16, 59, 60].

The costs associated with graduate surgical education has continued to rise over the last decade [Ref. 61]. Dedicated curricular adjuncts to live operative exposure have been implemented, but are significantly limited by high cost and facility regulations [Ref. 18-20]. Orthopedic surgical techniques, with spine surgery in particular, require significant hands-on learning time in order to gain a three-dimensional understanding of operative anatomy and manual feedback during various surgical scenarios. We have shared our detailed methods of production for these multi-polymer models in order to provide institutions with a stepwise means of creating multi-polymer anatomical models for education of spinal surgical techniques. It is likely that this method of polymer combination may also be applied for simulation of other orthopedic procedures and anatomical structures (long bones, digits, etc.) that require demonstration of the corticocancellous interface for fidelity [Ref. 62].

Conclusions

This translational study demonstrated that combining 3D printed ABS vertebral models with porous polyisocyanate foam is a feasible, cost effective, and valid method of simulating the corticocancellous interface of human vertebral bone for surgical education of spinal instrumentation methods. To our knowledge, this is the first study to investigate thermoplastic polymer combination for spinal surgical simulation of the ventral lamina and corticocancellous bone. The application of material properties with accurate representation of vital anatomic structures can be used to create powerful and cost-effective educational tools for surgical training, while simultaneously maximizing patient safety.

Example 2

Overview

Example 2 provides a method to create a surgical training model for use in teaching simulations related to spinal surgical techniques. The surgical training model includes a stimulator base to house an artificial spinal vertebrae at an anatomical correct location in the simulator base. The spinal vertebrae is 3D printed with a cancellous bone for the vertebrae model to create a vertebrae that mimics a human vertebrae. In addition to the spinal vertebrae, the training model includes synthetic skin, thermoplastic hydrogel muscle, and thermoplastic hydrogel fat. Each of the synthetic skin, thermoplastic hydrogel muscle, and thermoplastic hydrogel fat mimic human skin, muscle, and fat, respectively. The methods of creating each of the components of the surgical training model and the assembly of the surgical training model is described in detail below.

Stimulator Base Creation

The first step in the creation of the simulator is a base that may emulate an animal body cavity. Creating the base includes using a two part silicone rubber to create a flexible mold that will hold the rest of the components of the simulation device. The components include a 3D printed vertebrae, thermoplastic muscle tissue, thermoplastic fat tissue, and thermoplastic skin, each in an anatomically correct position.

A negative mold is created using a regular sheetrock plaster. The negative mold is allowed 24 hours to properly cure. A two part silicone mixture is then mixed and tinted. Each base requires approximately 12,000 cubic centimeters of silicone. The base created from the silicone mixture is reusable and should have multiple number of uses as long as the user does not damage it. The physical life of the mold depends on how it is used (materials cast, frequency, etc.). Casting abrasive materials such as concrete can quickly erode mold detail, while casting non-abrasive materials (wax) will not affect mold detail. Before storing, the mold should be cleaned with a soap solution and wiped fully dry. Two part (or more) molds should be assembled. Molds should be stored on a level surface in a cool, dry environment.

The product used for the base is Smooth-On Eco Flex 00-30 platinum cure silicone rubber. Ecoflex™ rubbers are platinum-catalyzed silicones that are versatile and easy to use. Ecoflex™ rubbers are mixed 1:1 ratio by weight or volume of Ecoflex™ A and Ecoflex™ B. The mixture is then cured at room temperature with negligible shrinkage. Low viscosity ensures easy mixing and de-airing. Cured rubber is very soft, very strong and very "stretchy", stretching many times its original size without tearing and will rebound to its original form without distortion. Cured Ecoflex™ 00-30 is skin safe and certified by an independent laboratory.

Ecoflex™ rubbers are water white translucent and can be color pigmented with a red pigment for creating a variety of color effects. For example, Silo Pia™ pigments can be used for creating a variety of color effects. You can also add Smooth-On's Silicone Thinner™ to further lower the viscosity. THI-VEX™ silicone thickener can be added by weight to Ecoflex™ silicones for brush-able applications. THI-VEX™ is made especially for thickening Smooth-On's silicones for vertical surface application and can achieve different viscosities. Similarly, Smooth-On's Silicone Thinner™ will lower the viscosity of Ecoflex™ silicones for easier pouring and vacuum degassing. A disadvantage is that ultimate tear and tensile are reduced in proportion to the amount of Silicone Thinner™ added. It is not recommended to exceed 10% by weight of total mixture. The rubbers are suitable for a variety of applications including making prosthetic appliances, cushioning for orthotics and special effects applications (especially in animatronics where repetitive motion is required).

While mixing the silicone rubber, it is essential to mix them in a properly ventilated area ("room size" ventilation), and to wear safety glasses, long sleeves and rubber gloves to minimize contamination risk. The rubber gloves should be vinyl gloves or latex gloves. However, latex gloves can inhibit the cure of the rubber to vinyl gloves are preferred. The silicone rubber should be stored and used at room temperature. Specifically, the temperature should be approximately 73° F. or 23° C. Warmer temperatures can drastically reduce working time and cure time. Storing the material at warmer temperatures can also reduce the usable shelf life of unused material. These products, as mentioned above, have a limited shelf life and should be used as soon as possible.

After the silicone rubber is cured, it be inhibited by certain contaminants in or on the pattern to be molded resulting in tackiness at the pattern interface or a total lack of cure throughout the mold. Latex, tin-cure silicone, sulfur clays, certain wood surfaces, newly cast polyester, epoxy or urethane rubber may cause inhibition. It compatibility between the rubber and the surface is a concern, a small-scale test is recommended. For the small-scale test, a small amount of rubber is applied onto a non-critical area of the pattern. If the rubber is gummy or uncured after the recommended cure time has passed, then the inhibition has occurred. Since no two applications are quite the same, the small-scale test application to determine suitability for a project is recommended if performance of this material is in question.

To prevent inhibition, one or more coatings of a clear acrylic lacquer are applied to the model surface. Any sealer should allowed to thoroughly dry before applying rubber. Even with a sealer, platinum silicones will not work with modeling clays containing heavy amounts of sulfur. Thus, a small-scale test for compatibility is recommended before using on a project.

A releasing agent is also applied to make demolding easier when pouring the silicone rubber material into the negative mold. For example, Ease Release™ 200 is a proven release agent for use with silicone rubber. Mann Ease Release™ products are available from Smooth-On or your Smooth-On distributor. To ensure thorough coverage, lightly brush the release agent with a soft brush over all surfaces of the model. Follow with a light mist coating and let the release agent dry for approximately 30 minutes. If there is any question about the effectiveness of a sealer/release agent combination, a small-scale test should be made on an identical surface for trial.

To create the base, first the Smooth-On Eco Flex 00-30 platinum cure silicone rubber part B is thoroughly mixed. Equal parts of the silicone rubber Part A and Part B are dispensed into a mixing container and mixed thoroughly for 1 to 5 minutes. Preferably, the mixture is mixed for 3 minutes. While mixing, both the sides and bottom of the mixing container should be scraped several times. After mixing parts A and B, vacuum degassing is done to eliminate any entrapped air. Vacuum material for 2-3 minutes (29 inches of mercury), making sure that you leave enough room in container for product volume expansion.

After the silicone rubber mixture is thoroughly mixed in a separate contained, the silicone rubber mixture is poured into the negative mold. When pouring the mixture, it should be poured into a single spot at the lowest point of the containment field. The rubber mixture should seek its level up and over the model. A uniform flow will help minimize entrapped air. The liquid rubber should level off at least half an inch or 1.3 centimeters over the highest point of the model surface.

Once the silicone rubber mixture is poured, the rubber is cured at room temperature (73° F./23° C.) before demolding. The rubber should not be cured where the temperature is less than 65° F. or 18° C. A post-curing procedure will aid the mold in quickly attaining maximum physical and performance properties. After curing at room temperature, expose the rubber to 176° F./80° C. for 2 hours and 212° F./100° C. for one hour. Allow the mold to cool to room temperature before using it.

When first cast, silicone rubber molds exhibit natural release characteristics. Depending on what is being cast into the mold, mold lubricity may be depleted over time and parts will begin to stick. No release agent is necessary when casting wax or gypsum. Applying a release agent such as Ease Release™ 200 (available from Smooth-On) prior to casting polyurethane, polyester and epoxy resins is recommended to prevent mold degradation.

Once the silicone rubber mixture has been cooled it creates the base. The base is then tinted with a blood color to simulate tissue. Silicone color pigments are used for coloring Smooth-On's silicone rubber compounds including the Ecoflex that was used. Silc Pig™ pigments also are also used to create mind blowing skin effects with systems such as Psycho Paint™ and Skin Tite™. Silc Pig™ pigments are concentrated, offer excellent dispersion and consistent color. Silc Pig™ pigments are very concentrated and a very small amount of pigment will color a proportionally large amount of silicone. The more added in proportion to the volume of liquid rubber, the more dramatic the color effect.

Cancellous Bone for Vertebrae Models

The method for corticocancellous bone used is a two part foam interface that simulates cancellous bone. A foam mixture is mixed and tinted. For example, a Foam-it 15 is mixed and tinted. The mixture is then injected into a 3D printed ABS vertebrae prior to simulator assembly. Smooth-On's FOAM-iT!™ Series are two-component water blown rigid polyurethane foams that are versatile and easy to use. FOAM-iT!™ products are available in 3 lb., 4 lb., 5 lb., 8 lb., 10 lb., 15 lb. or 26 lb. per cubic foot densities. Parts A and B of FOAM-iT! ™ are measured and mixed in equal amounts by volume. The mixture is then poured into a mold or other form. A release agent is applied, if necessary.

A small hole is created in the finished 3D printed structure of the spinal vertebrae and the foam mixture is injected into the hollow vertebrae for curing. The mixture will expand many times original volume and develop a uniform cell structure. FOAM-IT! ™ 15 is tack-free in about 4-6.5 minutes, developing handling strength in 20 minutes and full cure in 2 hours.

All FOAM-iT! ™ products can be used as a straight casting material, backfill material for hollow castings (adds structural strength) or as an encapsulation material, etc. They can be color pigmented with SO-Strong™, UVO™ or IGNITE™ colorants and are used for a variety of art/craft, industrial design and special effects applications.

Synthetic Skin

To develop the thermoplastic synthetic skin a mixture of PVAc solution, a skin colored pigment, and a cotton fiber cloth is used. In a small cup or bowl, the PVAc solution and a small amount of the skin colored pigment is mixed together. The PVAc solution can be clear Cra-Z-Art™ and the pigment can be Silo Pig™ flesh color. The mixture of PVAc and pigment is mixed until a consistent flesh like tone is achieved. A 12"×9" piece of cheese cloth is super saturated with the pigmented PVAc solution. In a small 12 inch×12 inch tray, a bed of alkali metal carbonate is poured. The alkali metal carbonate can be sodium bicarbonate or sodium carbonate. The sodium bicarbonate can be a commercially available baking soda. The layer of sodium bicarbonate or sodium carbonate should be about 0.25 inches thick. The saturated cotton fiber cloth should be lightly pressed over the baking soda to evenly flatten the simulated skin. The saturated cotton fiber should then be flipped over to press the other side of the saturated cotton fiber cloth in the bed of baking soda and repeat the flattening process on the other side as well. Lastly, the stimulated skin is rinsed to take the excess baking soda off the simulated skin with a light stream of water. Approximately 15 minutes should be given to the simulated skin to air dry.

Thermoplastic Hydrogel Fat

The method of making the thermoplastic hydrogel fat includes PVAc solution, alkali metal chloride, and alkali metal bicarbonate. The alkali metal chloride can be sodium chloride and the alkali metal carbonate can be sodium carbonate or sodium bicarbonate. The PVAc is poured into a pan that is deep enough for the desired fat thickness depending on the simulation. Stir in volume ratio of 10 PVAc 4 Sodium Bicarbonate: 5 Sodium Chloride until the PVAc solution thickens. Then, let the mixed mixture sit in the pan for 2-3 minutes. Any excess water should be removed the pan from hydrolysis with a paper towel. Yellow pigmentation can be added to the mixture for a fat appearance.

Thermoplastic Hydrogel Muscle

The method of making the thermoplastic hydrogel muscle includes PVAc solution, a source of sugar, alkali metal chloride, and an alkali metal carbonate or bicarbonate. The source of sugar can be any type of syrup including corn syrup. The alkali metal chloride can be sodium chloride and the alkali metal carbonate or bicarbonate can be sodium carbonate or sodium bicarbonate (e.g., baking soda).

A thin layer of a PVAc solution is mixed with red pigment and corn syrup over 3D printed ABS (acrylonitrile butadiene styrene) vertebrae. The mixture of the PVAc solution with red pigment and syrup should sit on the vertebrae for several seconds. Enough of the mixture should be poured over the vertebrae to cover the lamina and up to the midpoint of the spinous processes. This will create an "interspinous ligament". Then, add a small amount of baking soda and salt to the poured mixture and stir. Let the mixture sit for 60 seconds to solidify. After solidification, add more of the PVAc mixture with baking soda and salt until the mixture becomes slightly stiff. This allows for the polymer to adhere to the previously poured layer, simulating interspinous ligaments as well as tendinous insertions of erector spine muscles at the base of the spinous processes. Continue this process until the stiffened mixture is above the level of the spinous processes.

Each of the thermoplastic hydrogel muscle layer and the thermoplastic hydrogel fat layer, the amount of sodium chloride and sodium bicarbonate added to the polyvinyl acetate (PVAc) solution is tailored according to the desired properties. For example, the more sodium chloride that is added that stiffer the thermoplastic hydrogel muscle or fat becomes due to "salting out" of the PVAc solution. The sodium bicarbonate catalyzes the crosslinking and hydrolysis of the PVAc to a copolymer of polyvinyl alcohol (PVA) and PVAc, which can be further salted out by the sodium chloride.

The addition of NaCl to the polyvinyl acetate will strictly change the crystallinity of the polymer and not cause a reaction with it. This is a physical change only, not chemical change. The addition of the PVAc to a supersaturated solution of NaCl and sodium bicarbonate causes precipitation and hydrolysis to PVA/PVAc cross-linked molecules, and the texture of the material can be augmented based on the ratios of sodium bicarbonate and NaCl used.

Assembly of Model

Taking the base of the model that is now filled with the 3D printed vertebrae, penrose drain, ligament, and the muscle, pour a very small amount of PVAc solution on top. The thermoplastic hydrogel fat, previously created as described above, is placed on top of these layers and is allowed to stick to the thermoplastic hydrogel muscle layer. After the thermoplastic hydrogel fat layer sticks to the thermoplastic hydrogel muscle layer, the thermoplastic hydrogel skin layer is placed on top and also allowed to stick to the other layers.

Referring now to FIGS. 6-15, there is shown the method of assembly of a non-limiting example surgical simulation model 18. Each of the components of the model 18 shown in FIGS. 6-15 can be created using the methods described above.

Figure 6:
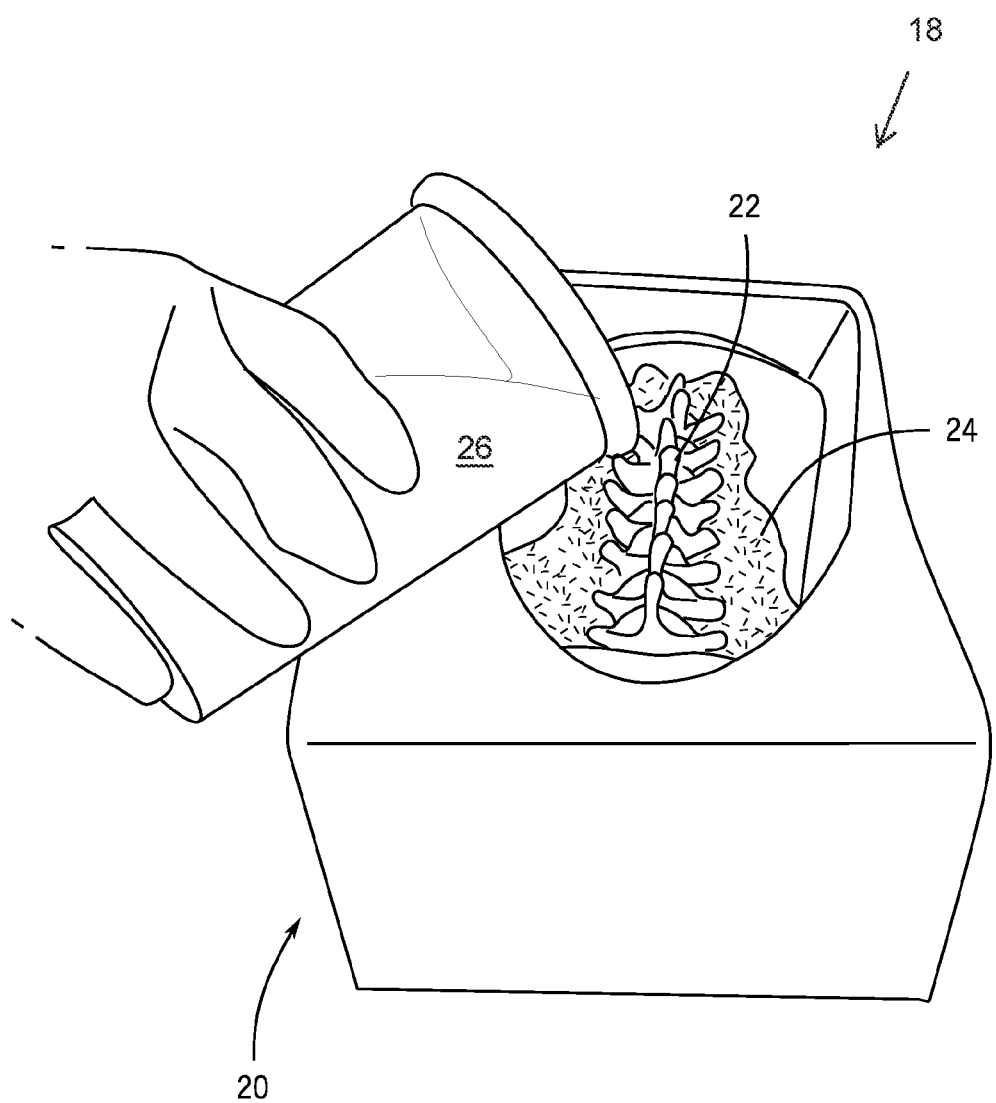
FIG. 6 shows a perspective view of a step in a method for creating a surgical training module assembly according to one embodiment of the invention.

Referring now to FIG. 6, there is shown an example simulator base 20, similar to the one described above that may emulate an animal body cavity, with a spinal vertebrae 22 according to one embodiment. The spinal vertebrae 22 is created as described above with respect to the cancellous bone vertebrae model. The spinal vertebrae can be 3D printed based on patient anatomy to mimic a human spinal vertebrae. A polyester filling 24 can also be used to fill the space between the bottom of the simulator base 20 and the 3D printed spinal vertebrae 22. An artificial latex penrose drain can also be added in the 3D printed vertebrae to simulate dura, filled with saline.

An artificial ligamentum flavum can be added to the underside of the vertebrae 22, in the simulator base 20, to mimic a human ligamentum flavum that serve as a covering over the spinal canal. The artificial ligamentum flavum can be created by pouring a mixture of PVAc solution, sodium chloride; and sodium bicarbonate. After pouring the mixture into the simulator base, let the mixture sit to stiffen.

Figure 7:
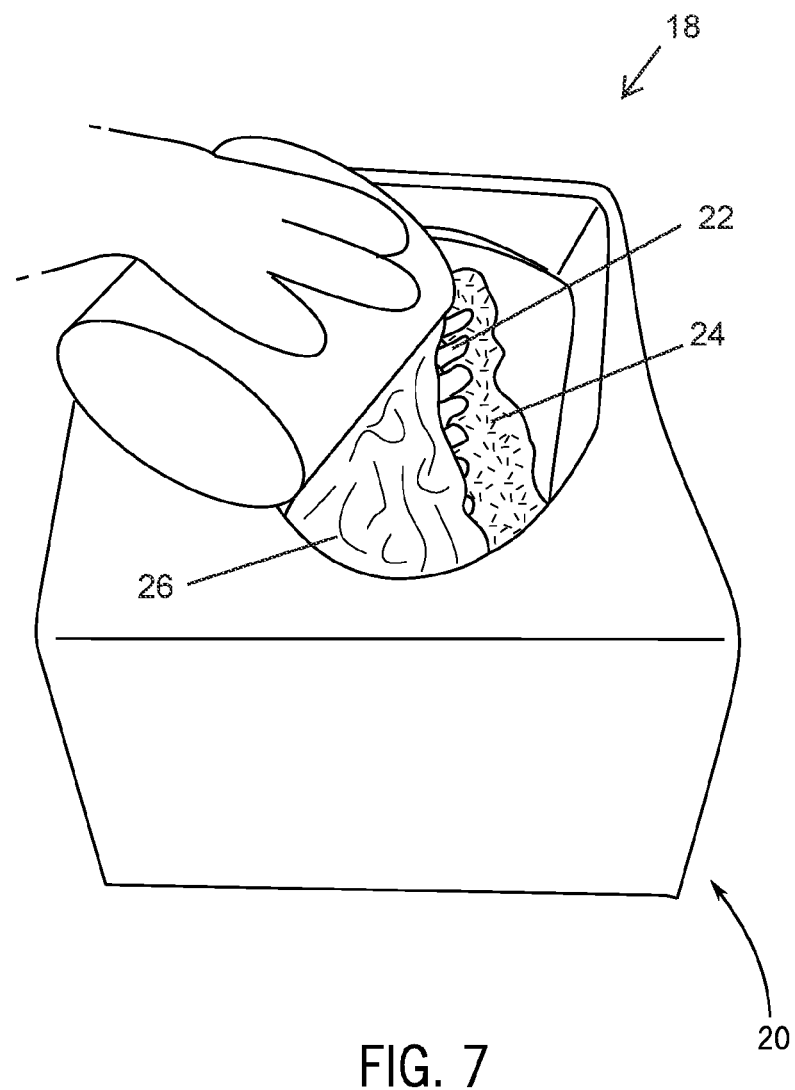
FIG. 7 shows a perspective view of a step subsequent to FIG. 6 in the method for creating the surgical training module assembly according to the embodiment of the invention.
Figure 8:
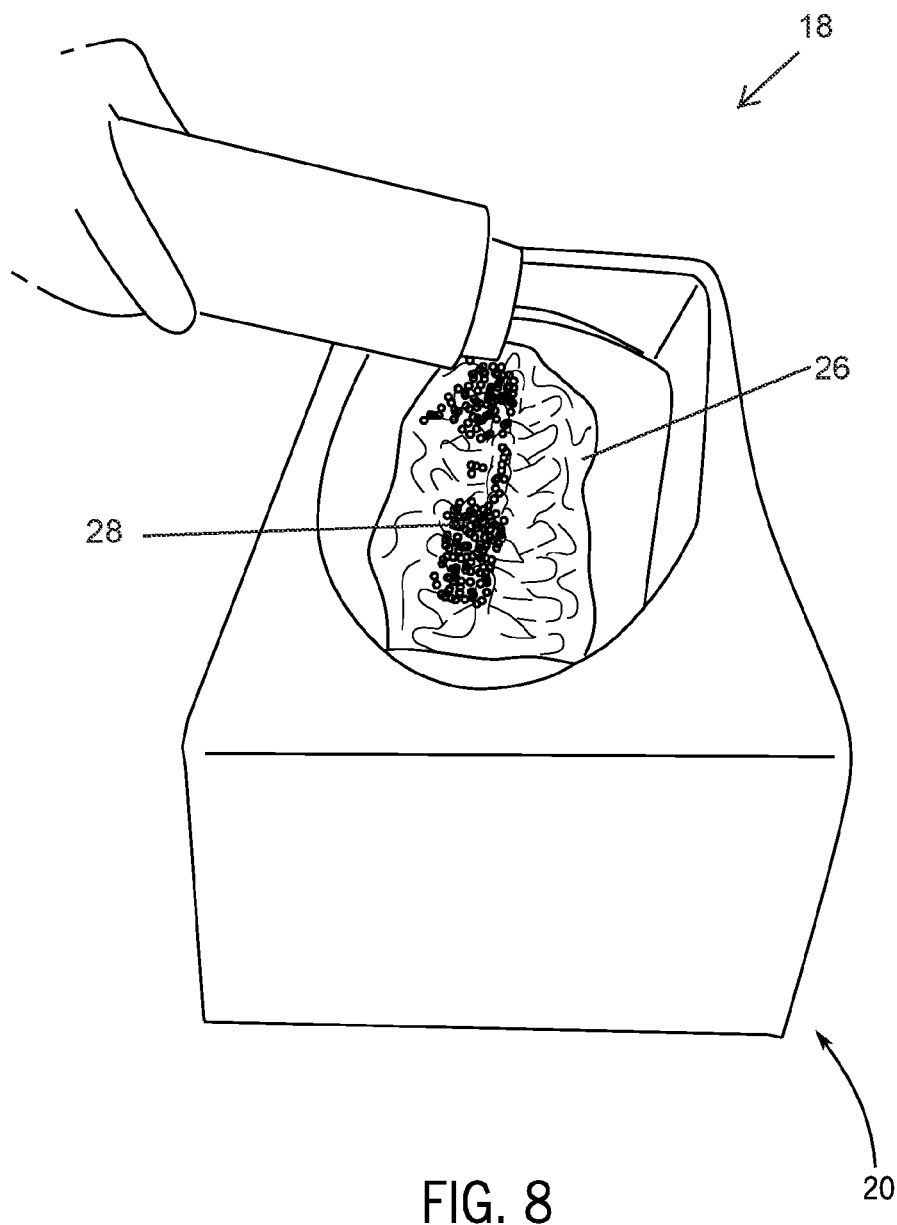
FIG. 8 shows a perspective view of a step subsequent to FIG. 7 in the method for creating the surgical training module assembly according to the embodiment of the invention.
Figure 9:
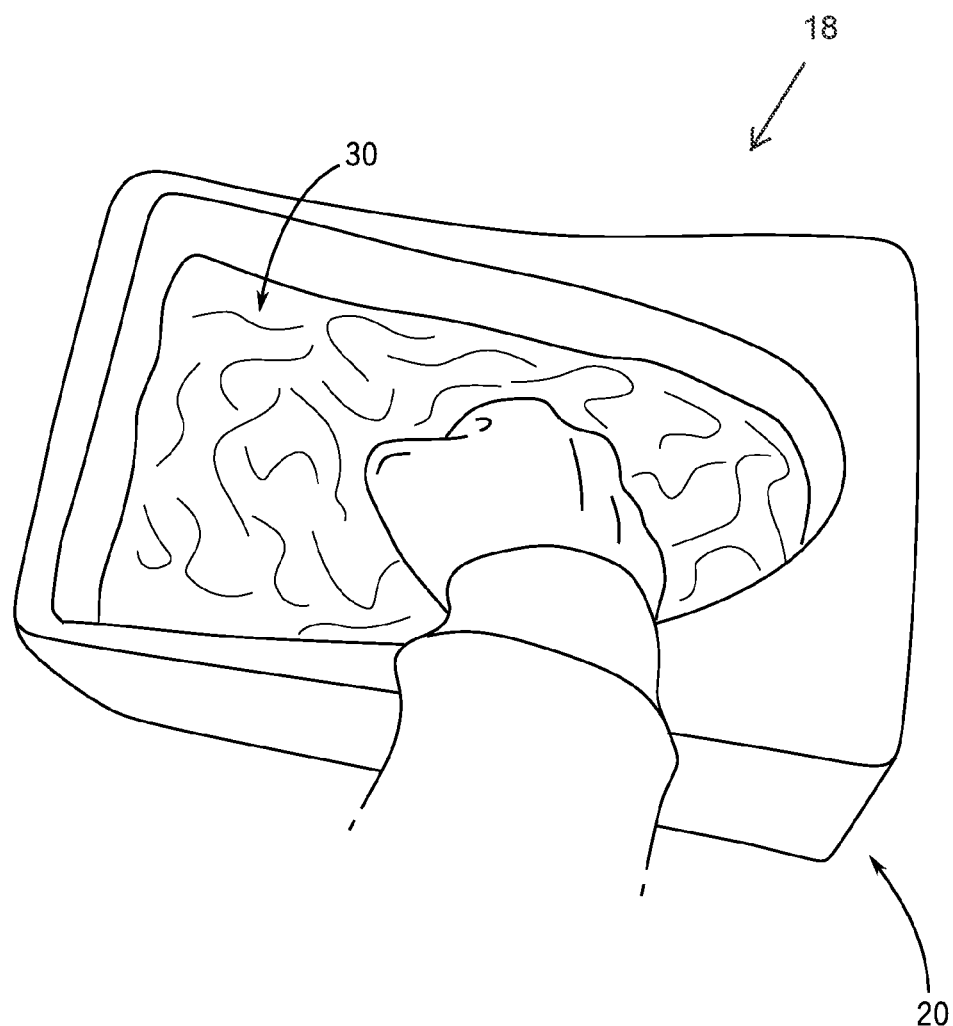
FIG. 9 shows a top view of a step subsequent to FIG. 8 in the method for creating the surgical training module assembly according to the embodiment of the invention.

FIGS. 6-11 further illustrate the method of creating the thermoplastic hydrogel muscle 30, as described above. FIGS. 6 and 7 shows a thin layer of a mixture 26 of the PVAc solution with red pigment and syrup should be poured into the simulator base 20, now containing the 3D printed vertebrae 22, penrose drain, and ligament. The mixture 26 should be allowed to sit on the vertebrae 22 for several seconds. As shown in FIG. 7, enough of the mixture 26 should be poured over the vertebrae 22 to cover the lamina and up to the midpoint of the spinous processes. This will create an "interspinous ligament". Then, as shown in FIG. 8, add a small amount 28 of baking soda and salt to the poured mixture 26 and stir, as shown in FIG. 9.

Figure 10:
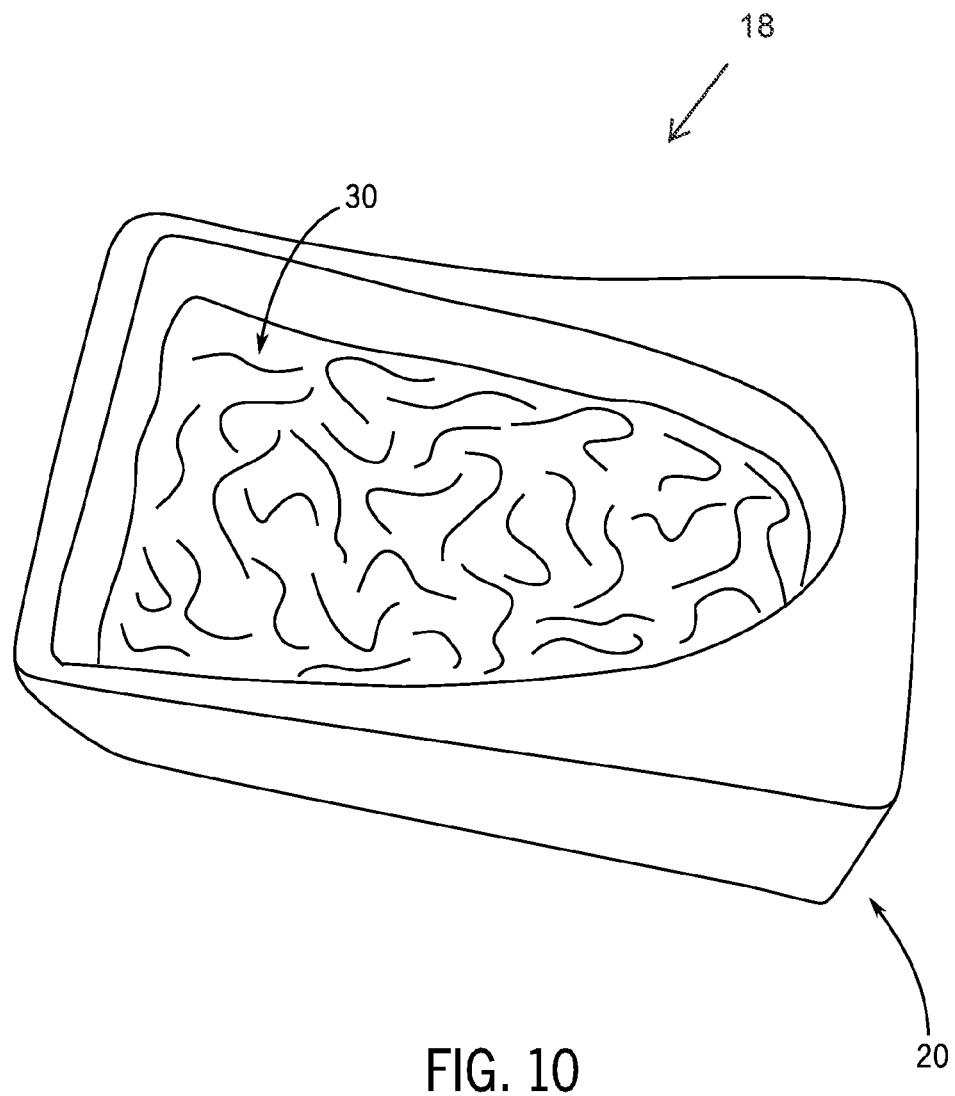
FIG. 10 shows a top view of a step subsequent to FIG. 9 in the method for creating the surgical training module assembly according to the embodiment of the invention.
Figure 11:
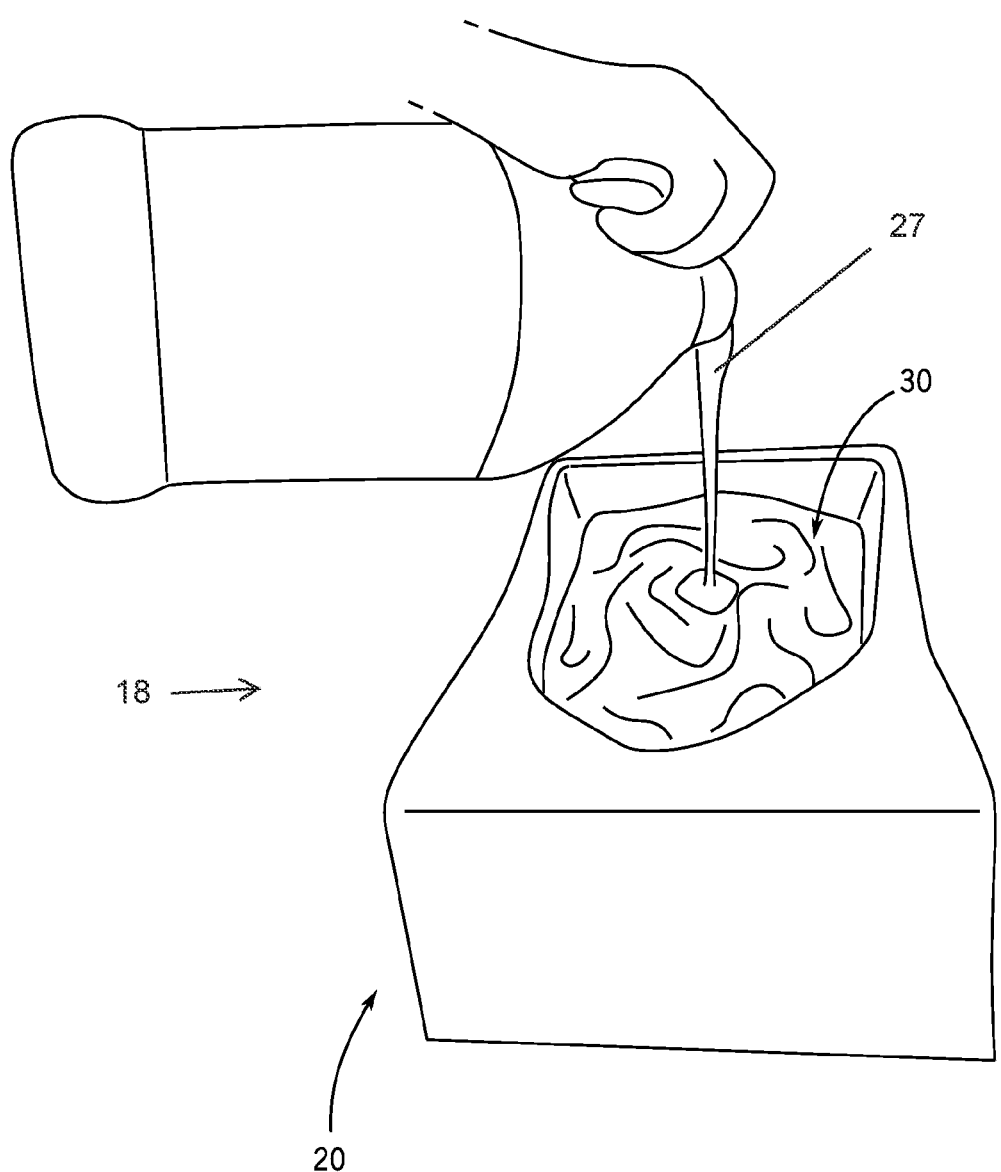
FIG. 11 shows a perspective view of a step subsequent to FIG. 10 in the method for creating the surgical training module assembly according to the embodiment of the invention.
Figure 12:
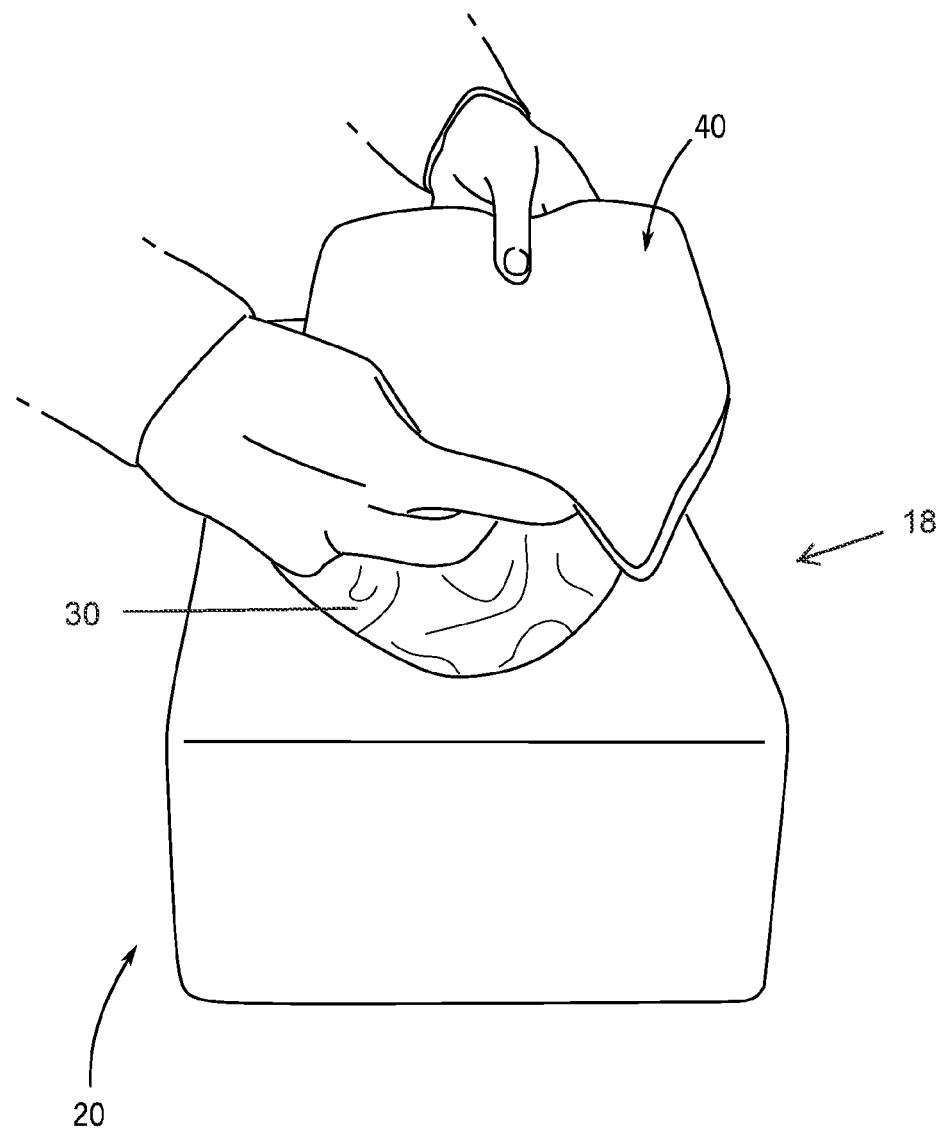
FIG. 12 shows a perspective view of a step subsequent to FIG. 11 in the method for creating the surgical training module assembly according to the embodiment of the invention.

Looking now to FIG. 10, let the combined mixtures 26, 28 sit for 60 seconds to solidify. After solidification, as depicted in FIG. 11, add more of a PVAc mixture 27 with baking soda and salt until the mixture becomes slightly stiff. This allows for the polymer to adhere to the previously poured layer, simulating interspinous ligaments as well as tendinous insertions of erector spine muscles at the base of the spinous processes. Continue this process until the stiffened mixture is above the level of the spinous processes.

Figure 13:
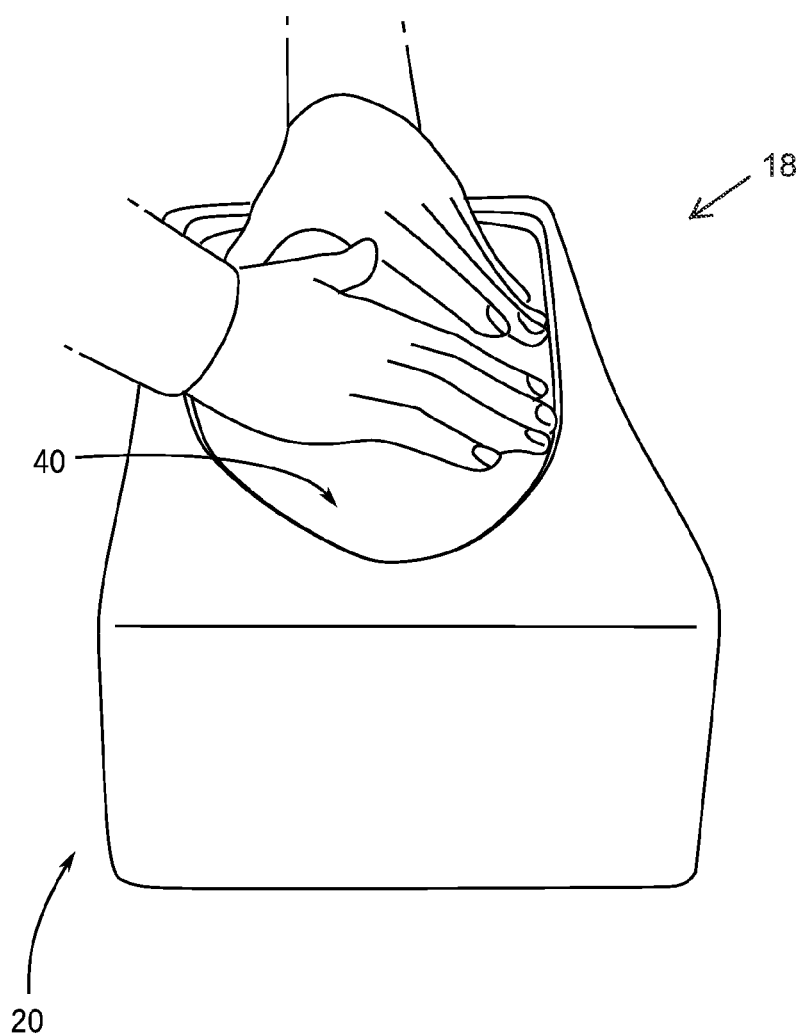
FIG. 13 shows a perspective view of a step subsequent to FIG. 12 in the method for creating the surgical training module assembly according to the embodiment of the invention.
Figure 14:
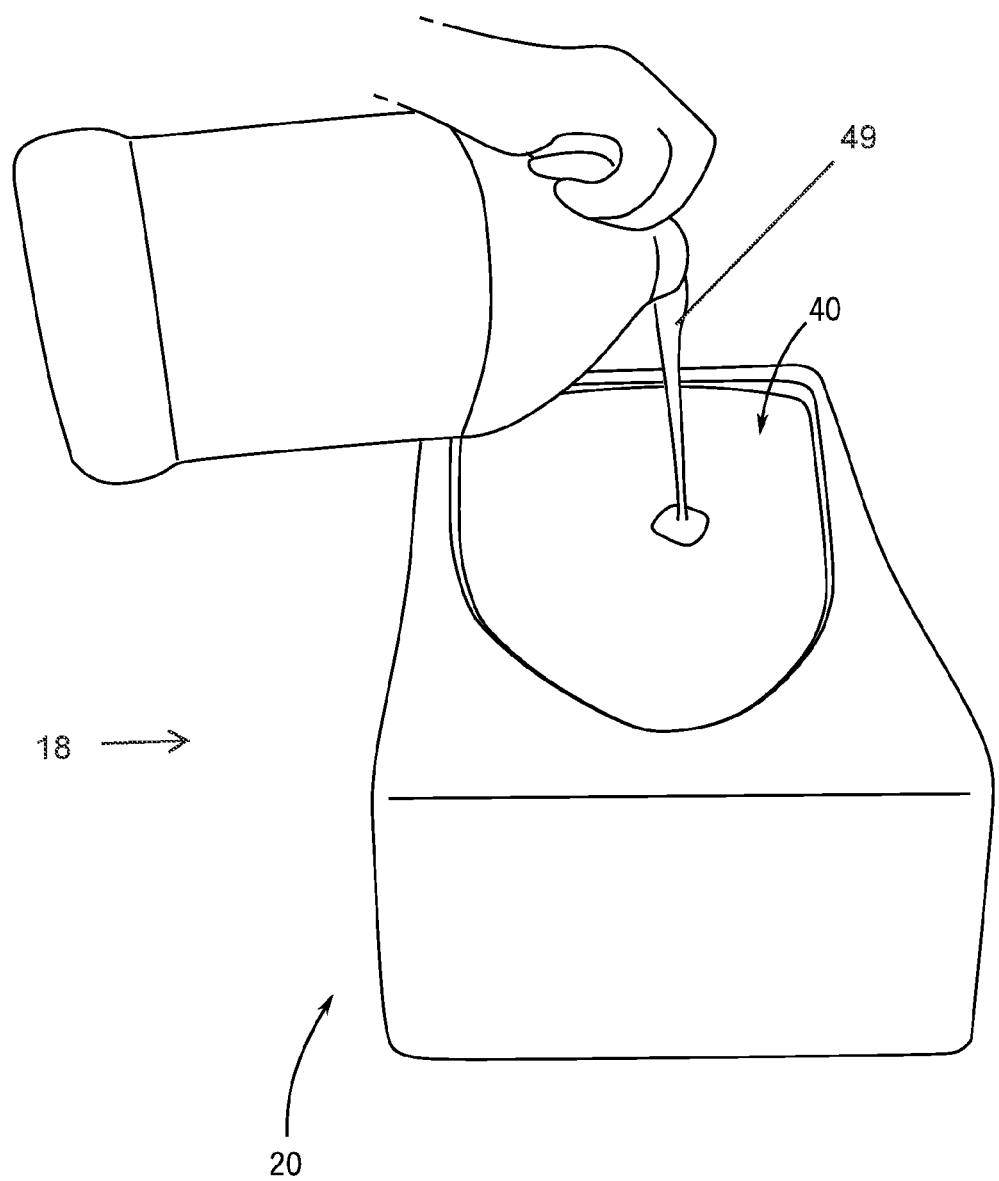
FIG. 14 shows a perspective view of a surgical training module assembly according to one embodiment of the invention.

The thermoplastic hydrogel fat 40, previously created as described above and shown in FIG. 12, is now placed on top of these layers of the thermoplastic hydrogel muscle 30 and is allowed to stick to the thermoplastic hydrogel muscle layer 30. To ensure that the fat layer 40 sticks to the muscle layer 30, the fat layer 40 is pressed into the muscle layer 30, as shown in FIG. 13. A layer of a mixture 49 of PVAc solution is then poured onto the thermoplastic hydrogel fat layer 40, as shown in FIG. 14.

Figure 15:
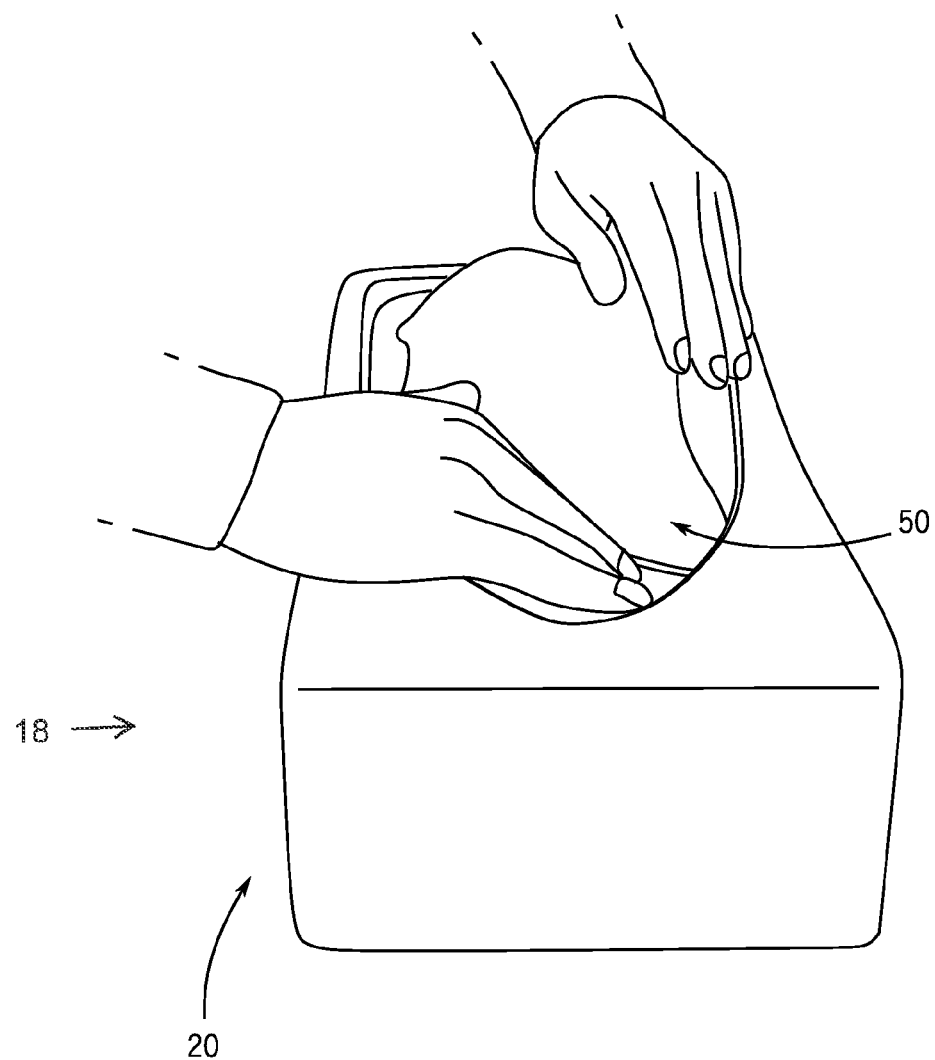
FIG. 15 shows a perspective view of a step subsequent to FIG. 14 in the method for creating the surgical training module assembly according to the embodiment of the invention.

After the thermoplastic hydrogel fat layer 40 sticks to the thermoplastic hydrogel muscle layer 30, the thermoplastic hydrogel skin layer 50 is placed on top, as shown in FIG. 15, and also allowed to stick to the other layers, similar to the process used to allow the thermoplastic hydrogel fat layer 40 to stick to the thermoplastic hydrogel muscle layer 30. Each of these steps provide the method for the assembly of the surgical training model 18.

Thus, the invention provides a method of polyvinyl acetate cross linking and hydrogel synthesis with inorganic salts and weak bases that is fast and cost effective for use in simulator design that mimics soft tissue properties of the human body, and allows the use of electrocautery for "start to finish" surgical training models. We have prototyped this for use in spinal surgical simulation, however these methods can be applied to any organ system such as muscle tissue, epithelial tissue, connective tissue, nervous tissue.

As one example, the muscular system simulation can include the human skeleton, joints, ligaments, muscular system, and tendons. As another example, the system simulation can include one or more tissues of the musculoskeletal system which comprises the human skeleton (which includes bones, ligaments, tendons, and cartilage) and attached muscles.

As an example of simulation of human bony structures, see Table 3.

TABLE 3

| Human Body (206) | | | |
|---|---|---|---|
| Axial Skeleton (80) | | | |
| Skull (28) | Torso (52) | Appendicular Skeleton (126) | |
| Paired Bones (11 × 2 = 22) | Paired Bones (12 × 2 = 24) | Upper Extremity (32 × 2 = 64) | Lower Extremity (31 × 2 = 62) |
| 1. Nasal | 1. Rib 1 | 1. Scapula | 1. Hip (Ilium, Ischium, Pubis) |
| 2. Lacrimal | 2. Rib 2 | 2. Clavicle | 2. Femur |
| 3. Inferior Nasal Concha | 3. Rib 3 | 3. Humerus | 3. Patella |
| 4. Maxiallary | 4. Rib 4 | 4. Radius | 4. Tibia |
| 5. Zygomatic | 5. Rib 5 | 5. Ulna | 5. Fibula |
| 6. Temporal | 6. Rib 6 | 6. Scaphoid | 6. Talus |
| 7. Palatine | 7. Rib 7 | 7. Lunate | 7. Calcaneus |
| 8. Parieral | 8. Rib 8 (False) | 8. Triquetrum | 8. Navicular |
| 9. Malleus | 9. Rib 9 (False) | 9. Pisiform | 9. Medial Cuneiform |
| 10. Incus | 10. Rib 10 (False) | 10. Hamate | 10. Middle Cuneiform |
| 11. Stapes | 11. Rib 11 (Floating) | 11. Capitate | 11. Lateral Cuneiform |
| 1. Frontal | 12. Rib 12 (Floating) | 12. Trapezoid | 12. Cuboid |
| 2. Ethmoid | 1. Hyoid | 13. Trapezium | 13. Metatarsal 1 |
| 3. Vomer | 2. Sternum | 14. Metacarpal 1 | 14. Proximal Phalange 1 |
| 4. Sphenoid | 3. Cervical Vertebrae 1 (atlas) | 15. Proximal Phalange 1 | 15. Distal Phalange 1 |
| 5. Mandible | 4. C2 (axis) | 16. Distal Phalange 1 | 16. Metatarsal 2 |
| 6. Occipital | 5. C3 | 17. Metacarpal 2 | 17. Proximal Phalange 2 |
| | 6. C4 | 18. Proximal Phalange 2 | 18. Middle Phalange 2 |
| | 7. C5 | 19. Middle Phalange 2 | 19. Distal Phalange 2 |
| | 8. C6 | 20. Distal Phalange 2 | 20. Metatarsal 3 |
| | 9. C7 | 21. Metacarpal 3 | 21. Proximal Phalange 3 |
| | 10. Thoracic Vertebrae 1 | 22. Proximal Phalange 3 | 22. Middle Phalange 3 |
| | 11. T2 | 23. Middle Phalange 3 | 23. Distal Phalange 3 |
| | 12. T3 | 24. Distal Phalange 3 | 24. Metatarsal 4 |
| | 13. T4 | 25. Metacarpal 4 | 25. Proximal Phalange 4 |
| | 14. T5 | 26. Proximal Phalange 4 | 26. Middle Phalange 4 |
| | 15. T6 | 27. Middle Phalange 4 | 27. Distal Phalange 4 |
| | | 28. Distal Phalange 4 | |

TABLE 3-continued

Human Body (206)

Axial Skeleton (80)

| Skull (28) | Torso (52) | Appendicular Skeleton (126) | |
|---|---|---|---|
| Paired Bones (11 × 2 = 22) | Paired Bones (12 × 2 = 24) | Upper Extremity (32 × 2 = 64) | Lower Extremity (31 × 2 = 62) |
| | 16. T7 | 29. Metacarpal 5 | 28. Metatarsal 5 |
| | 17. T8 | 30. Proximal Phalange 5 | 29. Proximal Phalange 5 |
| | 18. T9 | 31. Middle Phalange 5 | 30. Middle Phalange 5 |
| | 19. T10 | 32. Distal Phalange 5 | 31. Distal Phalange 5 |
| | 20. T11 | | |
| | 21. T12 | | |
| | 22. Lumbar Vertebrae 1 | | |
| | 23. L2 | | |
| | 24. L3 | | |
| | 25. L4 | | |
| | 26. L5 | | |
| | 27. Sacrum | | |
| | 28. Coccyx | | |

As another example, the digestive system simulation can include teeth, the tongue, salivary glands, parotid glands, submandibular glands, sublingual glands, pharynx, esophagus, stomach, small intestine, duodenum, jejunum, ileum, large intestine, liver, gallbladder, mesentery, pancreas, anal canal, anus, and blood cells. As another example, the respiratory system simulation can include nasal cavity, pharynx, larynx, trachea, bronchi, lungs, and diaphragm. As another example, the urinary system simulation can include kidneys, ureter, bladder, and urethra.

As another example, the reproductive organs simulation can include both the female and male reproductive systems. The female reproductive system simulation can include ovaries, fallopian tubes, uterus, vagina, vulva, clitoris, and placenta. The male reproductive system simulation can include testes, epididymis, vas deferens, seminal vesicles, prostate, bulbourethral glands, penis, and scrotum.

As another example, the endocrine system simulation can include the pituitary gland, pineal gland, thyroid gland, parathyroid glands, adrenal glands, and pancreas. As another example, the circulatory system simulation can include the heart, patent foramen ovale, arteries, veins, capillaries. As another example, the lymphatic system simulation can include the lymphatic vessel, lymph node, bone marrow, thymus, spleen, gut-associated lymphoid tissue, tonsils, and interstitium. As another example, the nervous system simulation can include the brain, cerebrum, cerebral hemispheres, diencephalon, the brainstem, midbrain, pons, medulla oblongata, cerebellum, the spinal cord, the ventricular system, choroid plexus.

As another example, the peripheral nervous system simulation can include the cranial nerves, spinal nerves, ganglia, and enteric nervous system. As another example, the sensory organs simulation can include the eye, ear, olfactory epithelium, and tongue. These organs can further include the cornea, iris, ciliary body, lens, retina, outer ear, earlobe, eardrum, middle ear, ossicles, inner ear, cochlea, vestibule of the ear, semicircular canals, and taste buds. As another example, the integumentary system simulation can include the mammary glands, skin, and subcutaneous tissue.

These methods of simulation can be used for replication of animal bone and soft tissue structures, including the representative anatomical parts as described above. This may be used for human and veterinary surgical simulation applications. Thus, as used herein, "animal" refers to humans and non-human animals.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment", "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein. Various features and advantages of the invention are set forth in the following claims.

REFERENCES

1. Thirukumaran, C. P. et al. National trends in the surgical management of adult lumbar isthmic spondylolisthesis: 1998 to 2011. *Spine* (Phila Pa. 1976) 41, 490-501, doi: 10.1097/brs.0000000000001238 (2016).
2. Kobayashi, K., Ando, K., Nishida, Y., Ishiguro, N. & Imagama, S. Epidemiological trends in spine surgery over 10 years in a multicenter database. *Eur. Spine. J.* 27, 1698-1703, doi:10.1007/s00586-018-5513-4 (2018).
3. Pereira, B. J. et al. Spinal surgery for degenerative lumbar spine disease: Predictors of outcome. *Clin. Neurol. Neurosurg.* 140, 1-5, doi:10.1016/j.clineuro.2015.11.004 (2016).
4. Kabins, M. B. & Weinstein, J. N. The history of vertebral screw and pedicle screw fixation. *Iowa. Orthop. J.* 11, 127-136 (1991).

5. Puvanesarajah, V., Liauw, J. A., Lo, S.-F., Lina, I. A. & Witham, T. F. Techniques and accuracy of thoracolumbar pedicle screw placement. *World. J. Orthop.* 5, 112-123, doi:10.5312/wjo.v5.i2.112 (2014).
6. Potter, B. K., Lehman, R. A. J. & Kuklo, T. R. Anatomy and biomechanics of thoracic pedicle screw instrumentation. *Curr. Opin. Orthop.* 15, 133-144 (2004).
7. Kim, Y. J., Lenke, L. G., Bridwell, K. H., Cho, Y. S. & Riew, K. D. Free hand pedicle screw placement in the thoracic spine: Is it safe? *Spine* 29, 333-342, doi:10.1097/01.Brs.0000109983.12113.9b (2004).
8. Stienen, M. N. et al. Neurosurgical resident education in Europe—results of a multinational survey. *Acta. Neurochir.* (Wien) 158, 3-15, doi:10.1007/s00701-015-2632-0 (2016).
9. Stienen, M. N. et al. Residency program trainee-satisfaction correlate with results of the European board examination in neurosurgery. *Acta. Neurochir.* (Wien) 158, 1823-1830, doi:10.1007/s00701-016-2917-y (2016).
10. Antiel, R. M. et al. Effects of duty hour restrictions on core competencies, education, quality of life, and burnout among general surgery interns. *JAMA. Surg.* 148, 448-455, doi:10.1001/jamasurg.2013.1368 (2013).
11. Badash, I., Burtt, K., Solorzano, C. A. & Carey, J. N. Innovations in surgery simulation: A review of past, current and future techniques. *Ann. Transl. Med.* 4, 453, doi:10.21037/atm.2016.12.24 (2016).
12. Fernandez, G. L. et al. Boot camp: Educational outcomes after 4 successive years of preparatory simulation-based training at onset of internship. *J. Surg. Educ.* 69, 242-248, doi:10.1016/j.jsurg.2011.08.007 (2012).
13. Ferrada, P., Anand, R. J., Amendola, M. & Kaplan, B. Cadaver laboratory as a useful tool for resident training. *Am. Surg.* 80, 408-409 (2014).
14. Kovacs, G., Levitan, R. & Sandeski, R. Clinical cadavers as a simulation resource for procedural learning. *AEM. Edu. Train.* 2, 239-247, doi:10.1002/aet2.10103 (2018).
15. Memon, I. Cadaver dissection is obsolete in medical training! A misinterpreted notion. *Med. Princ. Pract.* 27, 201-210, doi:10.1159/000488320 (2018).
16. Selden, N. R., Barbaro, N., Origitano, T. C. & Burchiel, K. J. Fundamental skills for entering neurosurgery residents: Report of a pacific region "boot camp" pilot course, 2009. *Neurosurgery* 68, 759-764; discussion 764, doi:10.1227/NEU.0b013e3182077969 (2011).
17. Selden, N. R. et al. A national fundamentals curriculum for neurosurgery pgy1 residents: The 2010 society of neurological surgeons boot camp courses. *Neurosurgery* 70, 971-981; discussion 981, doi:10.1227/NEU.0b013e31823d7a45 (2012).
18. Thomas, B. Basic surgical skills courses: An educational success story. *Ann. R. Coll. Surg. Engl.* 81, 195-196 (1999).
19. Thomas, W. E. G. Teaching and assessing surgical competence. Ann. R. Coll. Surg. Engl. 88, 429-432, doi:10.1308/003588406X116927 (2006).
20. Tortolani, P. J. et al. Cadaver training module for teaching thoracic pedicle screw placement to residents. *Orthopedics* 36, e1128-1133, doi:10.3928/01477447-20130821-13 (2013).
21. Gunderman, R. B. & Wilson, P. K. Viewpoint: Exploring the human interior: The roles of cadaver dissection and radiologic imaging in teaching anatomy. *Acad. Med.* 80, 745-749, doi:10.1097/00001888-200508000-00008 (2005).
22. Mowery, Y. M. A primer on medical education in the united states through the lens of a current resident physician. *Ann. Transl. Med.* 3, 270, doi:10.3978/j.issn.2305-5839.2015.10.19 (2015).
23. Grow B, S. J. The body trade, (2017).
24. Clifton, W. et al. A feasibility study for the production of three-dimensional-printed spine models using simultaneously extruded thermoplastic polymers. *Cureus* 11, e4440, doi:10.7759/cureus.4440 (2019).
25. Clifton, W., Nottmeier, E., Damon, A., Dove, C. & Pichelmann, M. The future of biomechanical spine research: Conception and design of a dynamic 3d printed cervical myelography phantom. *Cureus* 11, e4591, doi:10.7759/cureus.4591 (2019).
26. Clifton, W. et al. Development of a novel 3d printed phantom for teaching neurosurgical trainees the freehand technique of c2 laminar screw placement. *World. Neurosurg.* 129, e812-e820, doi:10.1016/j.wneu.2019.06.038 (2019).
27. Clifton, W. E., Damon, A. C. & Freeman, W. D. Development of a lumbar drain simulator for instructional technique and skill assessment. *Neurocrit. Care.*, doi:10.1007/s12028-019-00790-9 (2019).
28. Bohl, M. A. et al. The barrow biomimetic spine: Comparative testing of a 3d-printed I4-I5 Schwab grade 2 osteotomy model to a cadaveric model. *Cureus* 10, e2491, doi:10.7759/cureus.2491 (2018).
29. Bohl, M. A. et al. The barrow biomimetic spine: Fluoroscopic analysis of a synthetic spine model made of variable 3d-printed materials and print parameters. *Spine* (Phila Pa. 1976) 43, E1368-e1375, doi:10.1097/brs.0000000000002715 (2018).
30. Li, Y., Li, Z., Ammanuel, S., Gillan, D. & Shah, V. Efficacy of using a 3d printed lumbosacral spine phantom in improving trainee proficiency and confidence in CT-guided spine procedures. *3D Print Med* 4, 7, doi:10.1186/s41205-018-0031-x (2018).
31. Calvert, K. L., Trumble, K. P., Webster, T. J. & Kirkpatrick, L. A. Characterization of commercial rigid polyurethane foams used as bone analogs for implant testing. *J Mater Sci Mater Med* 21, 1453-1461, doi:10.1007/s10856-010-4024-6 (2010).
32. Bohl, M. A. et al. The barrow biomimetic spine: Effect of a 3-dimensional-printed spinal osteotomy model on performance of spinal osteotomies by medical students and interns. *J Spine Surg* 5, 58-65, doi:10.21037/jss.2019.01.05 (2019).
33. Ott, S. M. Cortical or trabecular bone: What's the difference? Am. J. Nephrol. 47, 373-375, doi:10.1159/000489672 (2018).
34. Pasoto, S. G. et al. Cortical bone density and thickness alterations by high-resolution peripheral quantitative computed tomography: Association with vertebral fractures in primary sjögren's syndrome. *Rheumatology* 55, 2200-2211, doi:10.1093/rheumatology/kew332 (2016).
35. Sharp, D. J., Tanner, K. E. & Bonfield, W. Measurement of the density of trabecular bone. *J. Biomech.* 23, 853-857, doi:https://doi.org/10.1016/0021-9290(90)90032-X (1990).
36. Wu, D., Isaksson, P., Ferguson, S. J. & Persson, C. Young's modulus of trabecular bone at the tissue level: A review. *Acta Biomater* 78, 1-12, doi:10.1016/j.actbio.2018.08.001 (2018).
37. Zioupos, P., Cook, R. B. & Hutchinson, J. R. Some basic relationships between density values in cancellous and cortical bone. *J Biomech* 41, 1961-1968, doi:10.1016/j.jbiomech.2008.03.025 (2008).

38. Wang, X. & Ni, Q. Determination of cortical bone porosity and pore size distribution using a low field pulsed nmr approach. *J. Orthop. Res.* 21, 312-319, doi:https://doi.org/10.1016/S0736-0266(02)00157-2 (2003).
39. Varghese, V., Krishnan, V. & Saravana Kumar, G. Testing pullout strength of pedicle screw using synthetic bone models: Is a bilayer foam model a better representation of vertebra? *Asian Spine J* 12, 398-406, doi: 10.4184/asj.2018.12.3.398 (2018).
40. Hao, J. et al. Material characterization and selection for 3d-printed spine models. *3D Print Med* 4, 8, doi:10.1186/s41205-018-0032-9 (2018).
41. Gama, N. V., Ferreira, A. & Barros-Timmons, A. Polyurethane foams: Past, present, and future. *Materials* (Basel, Switzerland) 11, 1841, doi:10.3390/ma11101841 (2018).
42. Hoffmeister, B. K., Huber, M. T., Viano, A. M. & Huang, J. Characterization of a polymer, open-cell rigid foam that simulates the ultrasonic properties of cancellous bone. *J. Acoust. Soc. Am.* 143, 911-920, doi:10.1121/1.5023219 (2018).
43. Filippou, V. & Tsoumpas, C. Recent advances on the development of phantoms using 3d printing for imaging with CT, MRI, PET, SPECT, and ultrasound. *Med. Phys.* 45, e740-e760, doi:10.1002/mp.13058 (2018).
44. Riggs, B. L. et al. Population-based study of age and sex differences in bone volumetric density, size, geometry, and structure at different skeletal sites. *J Bone Miner Res* 19, 1945-1954, doi:10.1359/jbmr.040916 (2004).
45. Koniorczyk, P., Trzyna, M., Zmywaczyk, J., Zygmunt, B. & Preiskorn, M. Study of polyurethane foaming dynamics using a heat flow meter. *Int. J. Thermophys.* 38, 71, doi:10.1007/s10765-017-2209-7 (2017).
46. George, E., Liacouras, P., Rybicki, F. J. & Mitsouras, D. Measuring and establishing the accuracy and reproducibility of 3d printed medical models. *RadioGraphics* 37, 1424-1450, doi:10.1148/rg.2017160165 (2017).
47. Henriks-Eckerman, M. L., Valimaa, J., Rosenberg, C., Peltonen, K. & Engstrom, K. Exposure to airborne isocyanates and other thermal degradation products at polyurethane-processing workplaces. *J Environ Monit* 4, 717-721 (2002).
48. Odgaard, A. Three-dimensional methods for quantification of cancellous bone architecture. *Bone* 20, 315-328, doi:10.1016/s8756-3282(97)00007-0 (1997).
49. Gong, H., Wang, L., Fan, Y., Zhang, M. & Qin, L. Apparent- and tissue-level yield behaviors of 14 vertebral trabecular bone and their associations with microarchitectures. *Ann Biomed Eng* 44, 1204-1223, doi:10.1007/s10439-015-1368-6 (2016).
50. Whitmarsh, T. et al. A cross-sectional study on the age-related cortical and trabecular bone changes at the femoral head in elderly female hip fracture patients. *Sci Rep* 9, 305, doi:10.1038/s41598-018-36299-y (2019).
51. Heiner, A. D. & Brown, T. D. Structural properties of a new design of composite replicate femurs and tibias. *J. Biomech.* 34, 773-781, doi:10.1016/s0021-9290(01)00015-x (2001).
52. Hetaimish, B. M. Sawbones laboratory in orthopedic surgical training. *Saudi Med. J.* 37, 348-353, doi:10.15537/smj.2016.4.13575 (2016).
53. Cristofolini, L. & Viceconti, M. Mechanical validation of whole bone composite tibia models. *J Biomech* 33, 279-288, doi:10.1016/s0021-9290(99)00186-4 (2000).
54. Cristofolini, L., Viceconti, M., Cappello, A. & Toni, A. Mechanical validation of whole bone composite femur models. *J. Biomech.* 29, 525-535, doi:https://doi.org/10.1016/0021-9290(95)00084-4 (1996).
55. Clifton, W., Damon, A., Nottmeier, E. & Pichelmann, M. The importance of teaching clinical anatomy in surgical skills education: Spare the patient, use a sim! *Clin Anat*, doi:10.1002/ca.23485 (2019).
56. Barak, M. M. & Black, M. A. A novel use of 3d printing model demonstrates the effects of deteriorated trabecular bone structure on bone stiffness and strength. *J Mech Behav Biomed Mater* 78, 455-464, doi:10.1016/j.jmbbm.2017.12.010 (2018).
57. Chapman, J. R. et al. Factors affecting the pullout strength of cancellous bone screws. *J Biomech Eng* 118, 391-398, doi:10.1115/1.2796022 (1996).
58. Lehman, R. A., Jr., Kang, D. G., Lenke, L. G., Gaume, R. E. & Paik, H. The ventral lamina and superior facet rule: A morphometric analysis for an ideal thoracic pedicle screw starting point. *Spine J* 14, 137-144, doi:10.1016/j.spinee.2013.06.092 (2014).
59. Malangoni, M. A., Biester, T. W., Jones, A. T., Klingensmith, M. E. & Lewis, F. R., Jr. Operative experience of surgery residents: Trends and challenges. *J Surg Educ* 70, 783-788, doi:10.1016/j.jsurg.2013.09.015 (2013).
60. Ahmed Ali, U. & Vogel, J. D. Safety of surgical resident training. *Adv Surg* 47, 45-57 (2013).
61. Babineau, T. J. et al. The "cost" of operative training for surgical residents. *Arch Surg* 139, 366-369; discussion 369-370, doi:10.1001/archsurg.139.4.366 (2004).
62. Atesok, K., Mabrey, J. D., Jazrawi, L. M. & Egol, K. A. Surgical simulation in orthopaedic skills training. *J Am Acad Orthop Surg* 20, 410-422, doi:10.5435/jaaos-20-06-410 (2012).

The citation of any document is not to be construed as an admission that it is prior art with respect to the present invention.

What is claimed is:

1. A method for creating a surgical training model, the method comprising:
    (a) providing a bony structure selected from a bone model or bone cadaveric tissue;
    (b) placing the bony structure in a cavity model that emulates an animal body cavity; and
    (c) forming a first layer in the cavity model, on top of the bony structure, wherein the first layer emulates one or more tissues of an animal musculoskeletal system,
    wherein step (c) comprises:
        combining polyvinyl acetate, a source of sugar, a crystallization agent, and a basic catalyst to form a mixture, and
        placing the mixture on top of the bony structure,
        wherein the polyvinyl acetate is crosslinked thereby forming the first layer on top of the bony structure.
2. The method of claim 1, wherein the crystallization agent is an ionic salt of an alkali metal or an alkaline earth metal.
3. The method of claim 1, wherein the basic catalyst is an ionic salt of an alkali metal or an alkaline earth metal.
4. The method of claim 1, wherein the source of sugar is a syrup selected from the group consisting of agave, barley malt, corn, high fructose corn, fruit syrup, glucose syrup, inverted sugar syrup, maple syrup, sugar beet syrup, and sorghum syrup.
5. The method of claim 1 wherein:
    the source of sugar is corn syrup, and
    the crystallization agent is sodium chloride, and
    the basic catalyst is sodium bicarbonate.

6. The method of claim 1, wherein step (c) comprises:
preparing a first mixture including polyvinyl acetate and a source of sugar,
placing an amount of the first mixture on top of the bony structure,
preparing a second mixture including a crystallization agent and a basic catalyst, and
contacting the first mixture on top of the bony structure with the second mixture,
wherein the polyvinyl acetate is crosslinked thereby forming the first layer on top of the bony structure.

7. The method of claim 6, wherein step (c) is repeated.

8. The method of claim 1, further comprising:
(d) placing a second layer over the first layer in the cavity model, wherein the second layer emulates an animal fat tissue, wherein step (d) comprises:
combining a first mixture including polyvinyl acetate, and a second mixture including a crystallization agent and a basic catalyst wherein the polyvinyl acetate is crosslinked thereby forming the second layer.

9. The method of claim 8, wherein the crystallization agent is an ionic salt of an alkali metal or an alkaline earth metal and the basic catalyst is an ionic salt of an alkali metal or an alkaline earth metal.

10. The method of claim 8 further comprising:
(e) placing a third layer over the second layer in the cavity model, wherein the third layer emulates an animal skin tissue, wherein step (e) comprises:
saturating a piece of fiber cloth with a first mixture including polyvinyl acetate;
pouring a solution of a basic catalyst in a tray;
laying the saturated fiber cloth over the solution;
pressing the saturated fiber cloth into the solution on a first side of the cloth and a second side of the cloth;
rinsing excess of the solution off of the saturated fiber cloth; and
drying the fiber cloth to create the third layer.

11. A surgical training model apparatus comprising:
a cavity model that emulates an animal body cavity;
a bone model placed in the cavity model, wherein the bone model is 3D printed from a thermoplastic polymer; and
a first layer on top of the bone model, wherein the first layer emulates one or more tissues of an animal musculoskeletal system, wherein the first layer comprises a reaction product of polyvinyl acetate, a source of sugar, a crystallization agent, and a basic catalyst.

12. The apparatus of claim 11, wherein the crystallization agent is an ionic salt of an alkali metal or an alkaline earth metal.

13. The apparatus of claim 11, wherein the basic catalyst is an ionic salt of an alkali metal or an alkaline earth metal.

14. The apparatus of claim 11, wherein the source of sugar is a syrup selected from the group consisting of agave, barley malt, corn, high fructose corn, fruit syrup, glucose syrup, inverted sugar syrup, maple syrup, sugar beet syrup, and sorghum syrup.

15. The apparatus of claim 11, wherein:
the source of sugar is corn syrup, and
the crystallization agent is sodium chloride, and
the basic catalyst is sodium bicarbonate.

16. The apparatus of claim 11, further comprising:
a second layer in the cavity model, on top of the first layer, wherein the second layer emulates an animal fat tissue, and
wherein the second layer comprises a reaction product of polyvinyl acetate, a crystallization agent, and a basic catalyst.

17. The apparatus of claim 16, wherein the crystallization agent is an ionic salt of an alkali metal or an alkaline earth metal.

18. The apparatus of claim 16, wherein the basic catalyst is an ionic salt of an alkali metal or an alkaline earth metal.

19. The apparatus of claim 16, further comprising:
a third layer in the cavity model, on top of the second layer, wherein the third layer emulates an animal skin tissue,
wherein the third layer comprises fiber cloth impregnated with a reaction product of polyvinyl acetate and a basic catalyst.

20. The apparatus of claim 19, wherein the basic catalyst is an ionic salt of an alkali metal or an alkaline earth metal.

* * * * *

UNITED STATES PATENT AND TRADEMARK OFFICE
CERTIFICATE OF CORRECTION

| | | |
|---|---|---|
| PATENT NO. | : 12,417,716 B2 | Page 1 of 1 |
| APPLICATION NO. | : 17/787405 | |
| DATED | : September 16, 2025 | |
| INVENTOR(S) | : William E. Clifton, III et al. | |

It is certified that error appears in the above-identified patent and that said Letters Patent is hereby corrected as shown below:

In the Specification

Column 21, Line 10, "Silo" should be --Silc--.

Column 21, Line 46, "It" should be --If--.

Column 23, Line 26, "Silo" should be --Silc--.

Column 31, Line 48, "14" should be --l4--.

Signed and Sealed this
Eighteenth Day of November, 2025

John A. Squires
*Director of the United States Patent and Trademark Office*